United States Patent
Takami et al.

(10) Patent No.: US 10,559,848 B2
(45) Date of Patent: Feb. 11, 2020

(54) SECONDARY BATTERY, COMPOSITE ELECTROLYTE, BATTERY PACK, AND VEHICLE

(71) Applicant: Kabushiki Kaisha Toshiba, Minato-ku (JP)

(72) Inventors: Norio Takami, Yokohama (JP); Kazuomi Yoshima, Tokyo (JP); Yasuhiro Harada, Isehara (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 240 days.

(21) Appl. No.: 15/262,275

(22) Filed: Sep. 12, 2016

(65) Prior Publication Data
US 2017/0077547 A1    Mar. 16, 2017

(30) Foreign Application Priority Data

Sep. 16, 2015 (JP) .................................. 2015-182546

(51) Int. Cl.
*H01M 10/056*       (2010.01)

(52) U.S. Cl.
CPC ...... *H01M 10/056* (2013.01); *H01M 2220/20* (2013.01); *H01M 2300/0091* (2013.01)

(58) Field of Classification Search
None
See application file for complete search history.

(56) References Cited

U.S. PATENT DOCUMENTS

| | | | |
|---|---|---|---|
| 5,011,751 A | 4/1991 | Yoneyama et al. | |
| 2012/0183836 A1 | 7/2012 | Harada et al. | |
| 2013/0026409 A1 | 1/2013 | Baker et al. | |
| 2013/0230778 A1 | 9/2013 | Saimen et al. | |
| 2014/0227614 A1 | 8/2014 | Lee et al. | |
| 2015/0118574 A1* | 4/2015 | Visbal | H01M 10/052 |
| | | | 429/322 |
| 2016/0268627 A1* | 9/2016 | Lee | H01M 4/485 |

FOREIGN PATENT DOCUMENTS

| | | |
|---|---|---|
| CN | 105958116 | 9/2016 |
| DE | 39 20 129 A1 | 12/1989 |
| JP | 3062203 B2 | 7/2000 |
| JP | 2010-272344 A | 12/2010 |

(Continued)

OTHER PUBLICATIONS

Extended European Search Report dated Jan. 30, 2017 in Patent Application No. 16188045.5.

(Continued)

*Primary Examiner* — Tracy M Dove
(74) *Attorney, Agent, or Firm* — Oblon, McClelland, Maier & Neustadt, L.L.P.

(57) ABSTRACT

According to one embodiment, a composite electrolyte includes lithium-containing oxide particles and an electrolytic composition. The electrolytic composition includes lithium ions, an organic solvent and a polymer. A content of the lithium-containing oxide particles in the composite electrolyte falls within a range of from 90% by weight to 98% by weight. A specific surface area of the lithium-containing oxide particles falls within a range of 10 $m^2/g$ to 500 $m^2/g$ and is measured by a BET adsorption method using $N_2$.

19 Claims, 7 Drawing Sheets

(56) References Cited

FOREIGN PATENT DOCUMENTS

JP    2013-182836 A    9/2013
WO    WO 2011/013254 A1    2/2011

OTHER PUBLICATIONS

Yun-Chae Jung, et al., "All Solid-State Lithium Batteries Assembled with Hybrid Solid Electrolytes" Journal of The Electrochemical Society, vol. 162, No. 4, 2015, pp. A704-A710.

Yun-Chae Jung, et al., "Ceramic Separators Based on Li+-Conducting Inorganic Electrolyte for High-Performance Lithium-ion Batteries with Enhanced Safety" Journal of Power Sources, vol. 293, 2015, pp. 675-683.

* cited by examiner

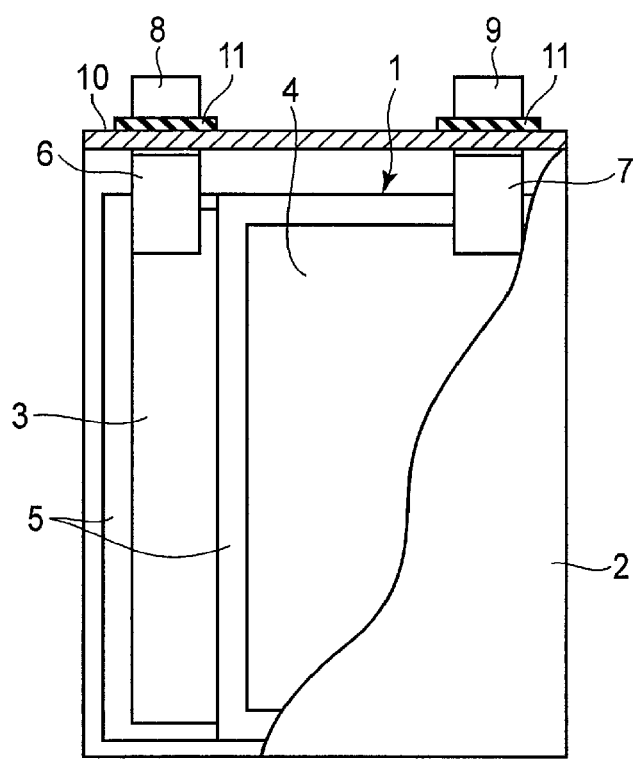
F I G. 1

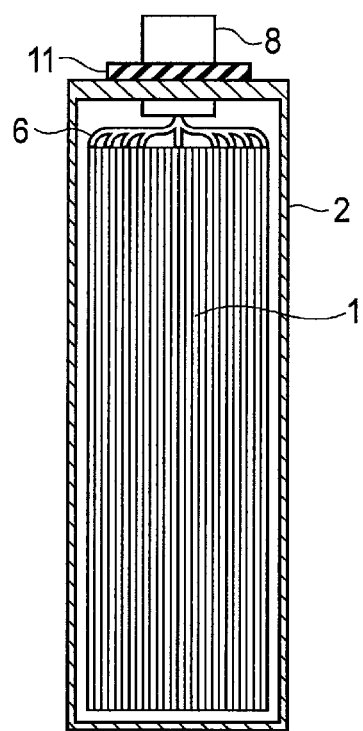
F I G. 2

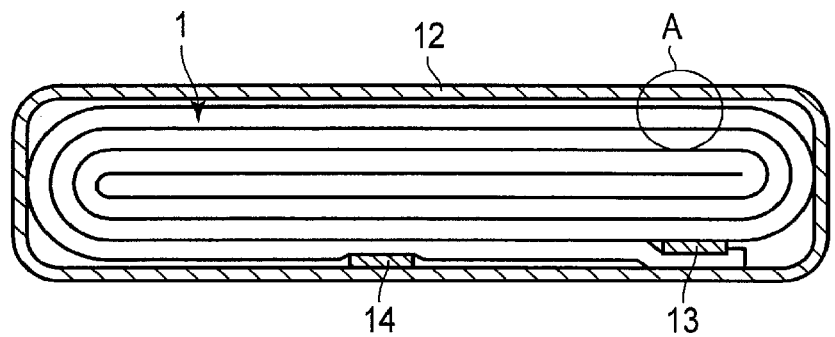
F I G. 3
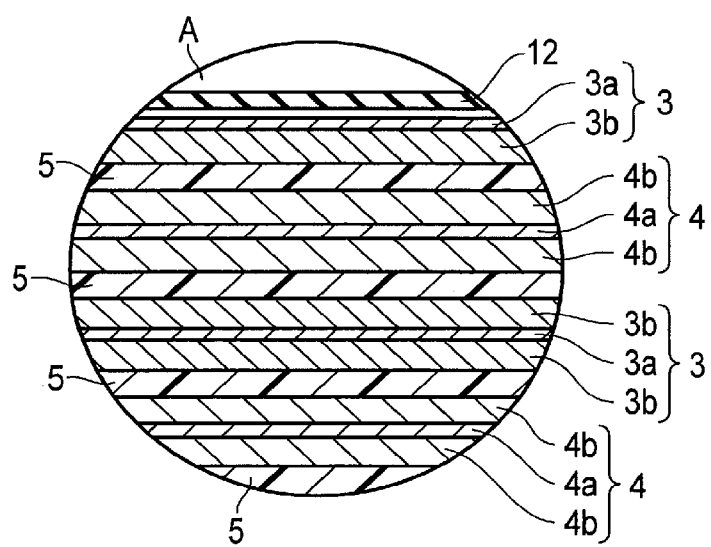
F I G. 4

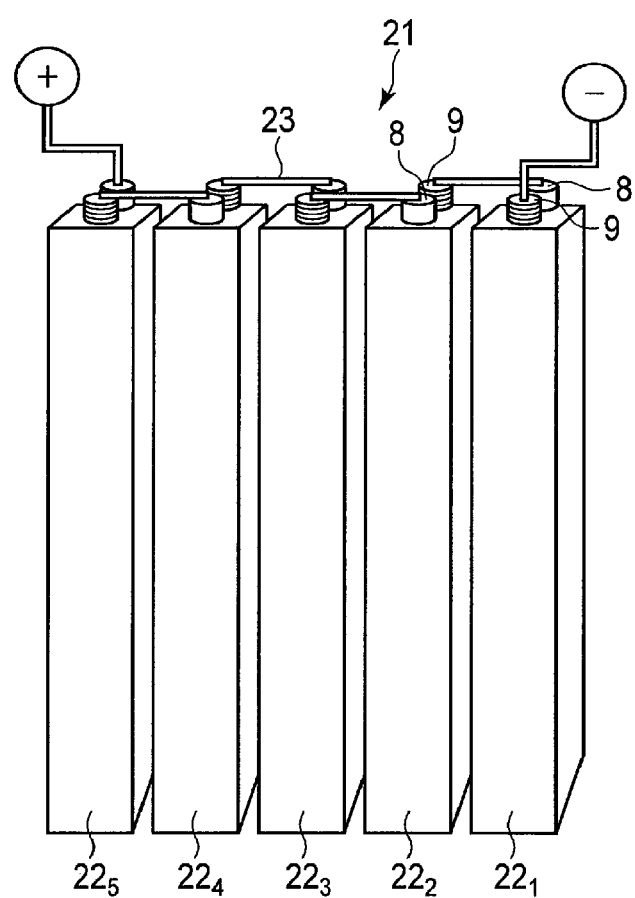
F I G. 6

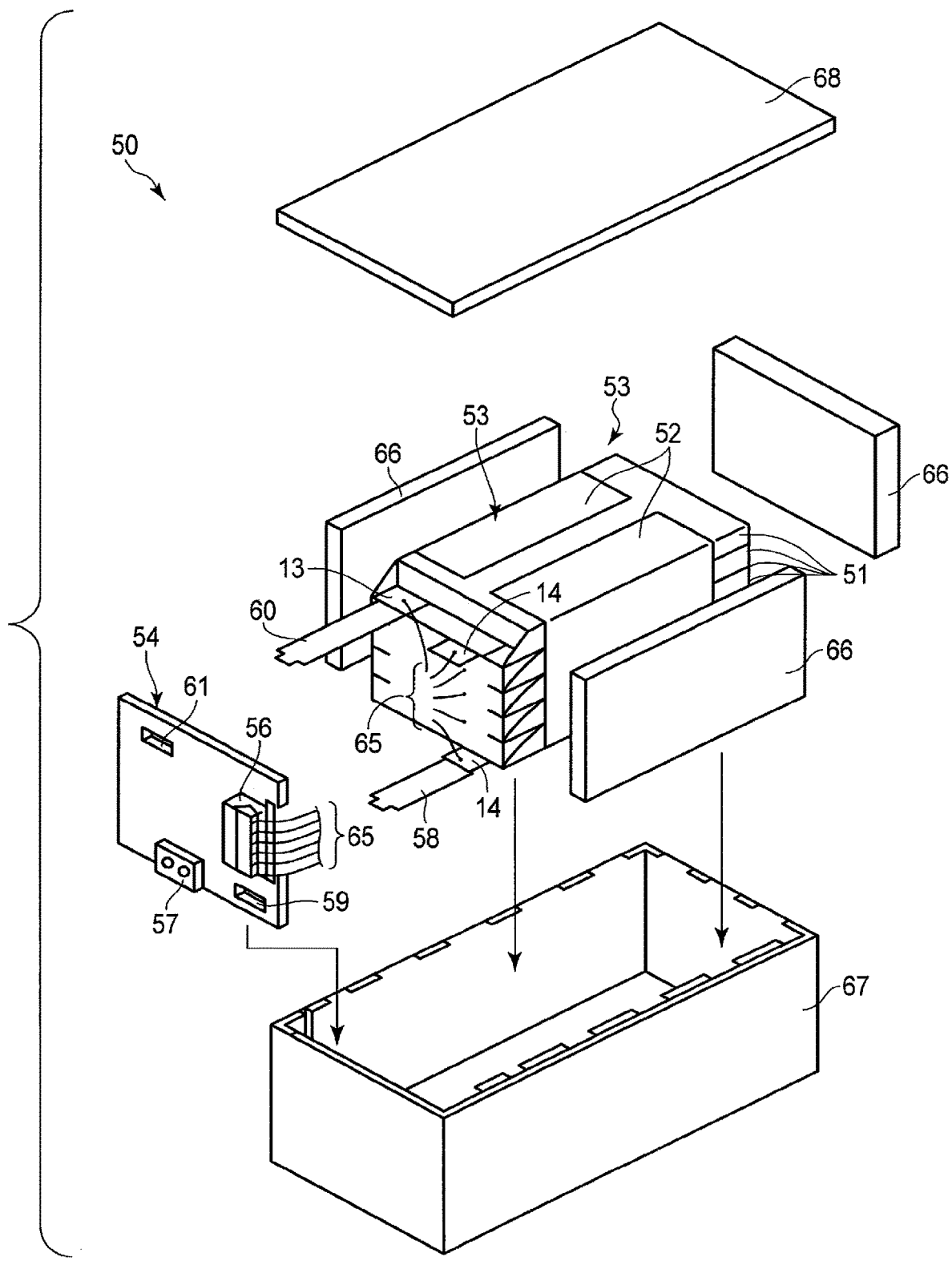
F I G. 7

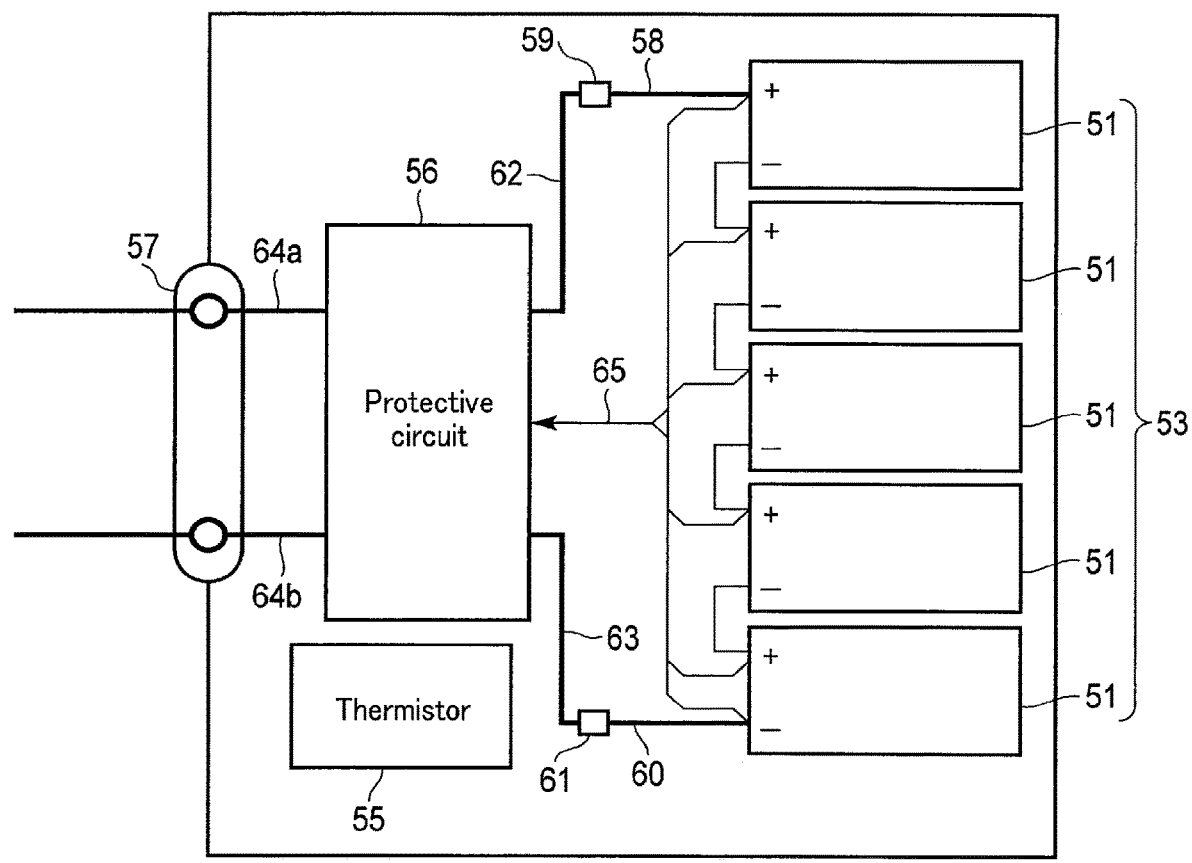
F I G. 8
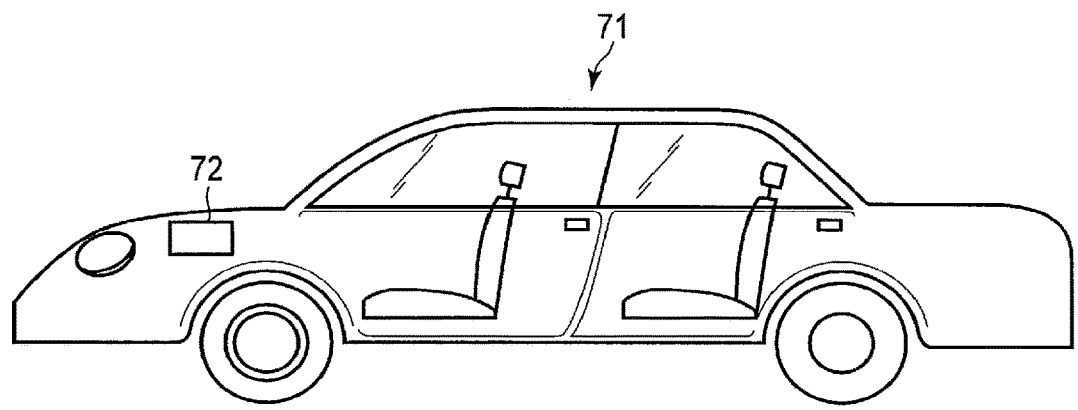
F I G. 9 ured and developed. Lithium ion batteries which include a positive electrode containing $LiCoO_2$, $LiNi_{1/3}Co_{1/3}Mn_{1/3}O_2$, or $LiMn_2O_4$ as an active material, and a negative

SECONDARY BATTERY, COMPOSITE ELECTROLYTE, BATTERY PACK, AND VEHICLE

CROSS-REFERENCE TO RELATED APPLICATIONS

This application is based upon and claims the benefit of priority from Japanese Patent Application No. 2015-182546, filed Sep. 16, 2015, the entire contents of which are incorporated herein by reference.

FIELD

Embodiments of the present invention relate to a secondary battery, a composite electrolyte, battery pack and vehicle.

BACKGROUND

Nonaqueous electrolyte batteries including a negative electrode containing a lithium metal, a lithium alloy, a lithium compound, or a carbonaceous material are anticipated to be used as high-energy-density batteries. Therefore, such nonaqueous electrolyte batteries are being exhaustively researched and developed. Lithium ion batteries which include a positive electrode containing $LiCoO_2$, $LiNi_{1/3}Co_{1/3}Mn_{1/3}O_2$, or $LiMn_2O_4$ as an active material, and a negative electrode containing a carbonaceous material which allows lithium ions to be inserted in and extracted from have been put to wide practical use. With regard to the negative electrode, metal oxides and alloys which are to be used in place of the carbonaceous material have been studied.

In the case of mounting a battery, particularly, on a vehicle such as an automobile, materials having excellent chemical and electrochemical stability, strength, and corrosion resistance are desired as the materials of the negative electrode to obtain cycle performance in a high-temperature environment, long reliability with high output, and safety. Furthermore, it is demanded that batteries have high performance in cold regions. It is required for these batteries to have high output performance and long-cycle life performance in a low-temperature environment. On the other hand, from the viewpoint of improving safety performance, the development of a solid electrolyte, nonvolatile electrolytic solution, and noninflammable electrolytic solution is underway. However, since the use of the solid electrolyte, nonvolatile electrolytic solution, or noninflammable electrolytic solution causes deteriorations in discharge rate performance, low-temperature performance, and long-cycle life performance of a battery, it has not been put to practical use yet. Research and development of a solid electrolyte such as an oxide solid electrolyte or a sulfide solid electrolyte to improve the ion conductivity of the solid electrolyte is underway. However, interface resistance between an electrode and a solid electrolyte is increased, which disadvantageously causes a large deterioration in both discharge performance and low-temperature performance. The joining strength between the electrode and the solid electrolyte is decreased during a charge-and-discharge cycle, which causes an increase in the interface resistance between the electrode and the solid electrolyte to cause deterioration in the cycle life performance of the battery. These problems impact on practical realization of a secondary battery using a solid electrolyte.

BRIEF DESCRIPTION OF DRAWINGS

FIG. 1 is a partially cutaway cross-sectional view of a secondary battery of an embodiment;

FIG. 2 is a side view of the battery of FIG. 1;

FIG. 3 is a cross-sectional view cut along a direction perpendicular to the extending direction of a terminal in the secondary battery of the embodiment;

FIG. 4 is an enlarged cross-sectional view of a part A of FIG. 3;

FIG. 6 is a perspective view showing an example of a battery module including the secondary battery of the embodiment;

FIG. 7 is an exploded perspective view of a battery pack of an embodiment;

FIG. 8 is a block diagram showing an electric circuit of the battery pack of FIG. 7; and FIG. 9 is a schematic view showing an example of a vehicle on which a nonaqueous electrolyte secondary battery of an embodiment is mounted.

DETAILED DESCRIPTION

Figure 5:
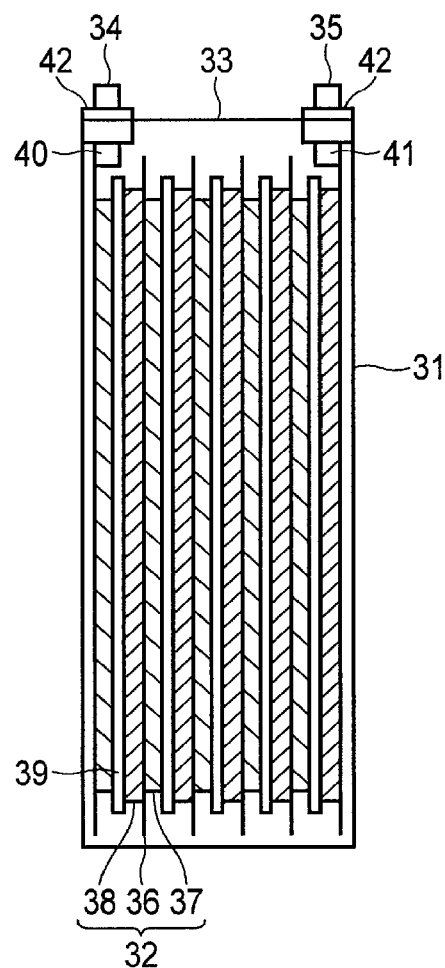
FIG. 5 is a cross-sectional view showing another example of the secondary battery according to the embodiment.

According to one embodiment, a secondary battery includes a positive electrode active material-containing layer, a negative electrode active material-containing layer and a composite electrolyte. The composite electrolyte is provided between the positive electrode active material-containing layer and the negative electrode active material-containing layer. The composite electrolyte includes lithium-containing oxide particles and an electrolytic composition. The electrolytic composition includes lithium ions, an organic solvent and a polymer. A content of the lithium-containing oxide particles in the composite electrolyte falls within a range of from 90% by weight to 98% by weight. A specific surface area of the lithium-containing oxide particles falls within a range of 10 m$^2$/g to 500 m$^2$/g and is measured by a BET adsorption method using N$_2$.

According to another embodiment, a battery pack includes the secondary battery according to the embodiment.

According to another embodiment, a vehicle includes the battery pack according to the embodiment.

According to another embodiment, a composite electrolyte includes lithium-containing oxide particles and an electrolytic composition. The electrolytic composition includes lithium ions, an organic solvent and a polymer. A content of the lithium-containing oxide particles in the composite electrolyte falls within a range of from 90% by weight to 98% by weight. A specific surface area of the lithium-containing oxide particles falls within a range of 10 m$^2$/g to 500 m$^2$/g and is measured by a BET adsorption method using N$_2$.

First Embodiment

A first embodiment provides a composite electrolyte containing lithium-containing oxide particles and an electrolytic composition. The specific surface area of the lithium-containing oxide particles measured by the BET adsorption method using N$_2$ is 10 m$^2$/g to 500 m$^2$/g. The content of the lithium-containing oxide particles in the composite electrolyte is 90% by weight to 98% by weight. The electrolytic composition contains lithium ions, an organic solvent, and a polymer.

The present inventors determined that the lithium ion conductivity of the lithium-containing oxide particles is improved by the composite electrolyte containing the lithium-containing oxide particles having a specific surface area of 10 to 500 m$^2$/g measured by the BET adsorption method using N$_2$, and the electrolytic composition. It is presumed that the reason therefor is as follows. Advantageously, the lithium-containing oxide particles having the specific surface area do not cause a problem such as dissolution since the lithium-containing oxide particles are chemically stable to the electrolytic composition. It is presumed that when the lithium-containing oxide particles are brought into contact with the electrolytic composition for this reason, lithium is unevenly distributed or biased on the surface of the particles, which causes a decrease in the activation energy of ion conduction at the interface between the particle and the electrolytic composition (particularly, the polymer), to provide an improvement in the lithium ion conductivity of the lithium-containing oxide particles.

By setting the content of the lithium-containing oxide particles in the composite electrolyte to 90% by weight to 98% by weight, excellent charge-and-discharge cycle life, low-temperature performance, and thermal stability of the secondary battery can be provided. By setting the content of the lithium-containing oxide particles in the composite electrolyte to be less than 90% by weight, self-discharge caused by an internal short circuit due to a decrease in the strength of the composite electrolyte is increased. When the content exceeds 98% by weight, the ion conductivity of the composite electrolyte is rapidly deteriorated, which causes deterioration in discharge performance or low-temperature performance. The content is more preferably 92% by weight to 96% by weight.

The organic solvent desirably contains carbonates. Thereby, the ion conductivity of the composite electrolyte is improved. The carbonates are preferably at least one selected from a group consisting of propylene carbonate, ethylene carbonate, butylene carbonate, diethyl carbonate, and methylethyl carbonate. One kind or two or more kinds of the organic solvent can be used.

The lithium-containing oxide particles are desirably particles made of a lithium ion conductive oxide solid electrolyte having a garnett type structure. The solid electrolyte advantageously has high reduction resistance and a wide electrochemistry window. Thereby, the ion conductivity of the composite electrolyte can be improved to improve the charge-and-discharge cycle life, low-temperature performance, and thermal stability of the secondary battery.

In the composite electrolyte, the lithium-containing oxide particles are desirably brought into contact with the electrolytic composition. For example, at least a part of the surface of the lithium-containing oxide particles is covered with the electrolytic composition.

The composite electrolyte will be described in detail.

Examples of the lithium-containing oxide particles include oxide particles having no lithium ion conductivity and an oxide solid electrolyte having lithium ion conductivity. An oxide solid electrolyte having high lithium ion conductivity promotes the movement of lithium ions at the interface between the oxide solid electrolyte and a polymer. The kind of the lithium-containing oxide particles to be used can be set to one kind or two kinds or more.

Examples of the oxide particles having no lithium ion conductivity or very small lithium ion conductivity include a lithium aluminum oxide ($LiAlO_2$, $Li_xAl_2O_3$ where $0<x\leq1$), a lithium silicon oxide, and a lithium zirconium oxide.

The oxide solid electrolyte having lithium ion conductivity includes an oxide solid electrolyte having a garnett type structure. The oxide solid electrolyte having a garnett type structure advantageously has high reduction resistance and a wide electrochemistry window. Examples of the oxide solid electrolyte having a garnett type structure include $La_{5+x}A_xLa_{3-x}M_2O_{12}$ (A is at least one element selected from the group consisting of Ca, Sr, and Ba; M is Nb and/or Ta; and x is preferably 0.5 or less (including 0)), $Li_3M_{2-x}L_2O_{12}$ (M is Nb and/or Ta; L contains Zr; and x is 0.5 or less (including 0)), $Li_{7-3x}Al_xLa_3Zr_3O_{12}$ (x is preferably 0.5 or less (including 0)), and $Li_7La_3Zr_2O_{12}$. Among these, $Li_{6.25}Al_{0.25}La_3Zr_3O_{12}$, $Li_{6.4}La_3Zr_{1.4}Ta_{0.6}O_{12}$, $Li_{6.4}La_3Zr_{1.6}Ta_{0.6}O_{12}$, and $Li_7La_3Zr_2O_{12}$ have high ion conductivity, and are electrochemically stable, which advantageously have excellent discharge performance and cycle life performance. The microparticles having a specific surface area of 10 to 500 $m^2/g$ (preferably, 50 to 500 $m^2/g$) advantageously provides chemical stability to the organic solvent.

The oxide solid electrolyte having lithium ion conductivity also includes a lithium phosphate solid electrolyte having NASICON type structure. Examples of the lithium phosphate solid electrolyte having NASICON type structure include $LiM1_2(PO_4)_3$, where M1 is at least one element selected from a group consisting of Ti, Ge, Sr, Zr, Sn and Al. $Li_{1+x}Al_xGe_{2-x}(PO_4)_3$, $Li_{1+x}Al_xZr_{2-x}(PO_4)_3$, $Li_{1+x}Al_xTi_{2-x}(PO_4)_3$, where x can fall within a range of $0\leq x\leq 0.5$, have high ion conductivity and high electrochemically stability. A combination of the lithium phosphate solid electrolyte having NASICON type structure and the oxide solid electrolyte having the garnett type structure can be used.

The lithium-containing oxide particles may include independent primary particles, secondary particles as an aggregate of the primary particles, and both the independent primary particles and the secondary particles.

The average size (diameter) of the lithium-containing oxide particles is desirably 0.01 μm to 0.5 μm. This range provides an improvement in the ion conductivity in the composite electrolyte, which provides improvements in discharge performance and low-temperature performance. The range is more preferably 0.05 μm to 0.3 μm.

Lithium-containing oxide particles having a specific surface area of 10 to 500 $m^2/g$ measured by the BET adsorption method using $N_2$ are obtained by decreasing the average particle size (diameter) to 0.1 μm or less, for example.

Lithium ions are obtained by introducing a lithium salt into a polymer, compositing the lithium salt and the polymer, or dissolving the lithium salt in the polymer, for example. Examples of the lithium salt include $LiPF_6$, $LiClO_4$, $LiBF_4$, $LiCF_3SO_3$, $LiN(FSO_2)_2$, and $LiN(CF_3SO_2)_2$. At least one lithium salt selected from the group consisting of $LiPF_6$, $LiBF_4$, and $LiN(FSO_2)_2$ improves ion conductivity to improve discharge performance. One kind or two or more kinds of the lithium salt can be used.

The organic solvent desirably has a boiling point of 150° C. or higher. Thereby, the durability and life performance in a high-temperature environment of the composite electrolyte can be improved. One kind or two or more kinds of the organic solvent can be used.

Examples of the carbonates include ethylene carbonate (EC), propylene carbonate (PC), and butylene carbonate (BC) as cyclic carbonates, and diethyl carbonate (DEC), methylethyl carbonate (MEC), and dimethyl carbonate (DMC) as chain carbonates. The use of propylene carbonate (PC), diethyl carbonate (DEC), and methylethyl carbonate (MEC) provides an improvement in low-temperature performance.

The organic solvent can contain another solvent other than the carbonates. Examples of the other solvent include γ-butyrolactone (GBL), α-methyl-γ-butyrolactone (MBL), phosphoric esters (for example, trimethyl phosphate ($PO(OCH_3)_3$), triethyl phosphate ($PO(OC_2H_5)_3$), and tripropyl phosphate ($PO(OC_3H_7)_3$), tributylphosphate ($PO(OC_4H_9)_3$). When γ-butyrolactone or trimethyl phosphate is used in particular, an increase in ion conductive resistance in a low-temperature environment is suppressed, which can provide an improvement in discharge performance under low temperature (−30° C. or lower).

The polymer is not particularly limited as long as it provides gelation of an organic solvent or electrolytic solution which contain lithium ions. Both a chemical gelling agent and a physical gelling agent can be used. Examples thereof include polymers gelating with carbonates such as polyacrylonitrile (PAN), polyethylene oxide (PEO), polyvinylidene fluoride (PVdF), and polymethyl methacrylate. When the compositing of the carbonates and polymer produces a gel of polymer electrolyte, the ion conductivity of the composite electrolyte is improved. A gel of polymer electrolyte containing polyacrylonitrile has high ion conductivity and has improved discharge performance and low-temperature performance, which is preferable. The content of the polymer in the composite electrolyte is preferably 0.2% by weight to 3% by weight. The deviation of the content from this range may cause degradations in low-temperature performance or discharge performance. The kind of the polymer can be set to one kind or two kinds or more. Since a sulfur component is dissolved when any kind of the above polymers is used in combination with sulfide solid electrolyte particles having high lithium ion conductivity, the combination of the sulfide solid electrolyte particles and the above polymers cannot be used.

The composite electrolyte desirably further contains a binder. Thereby, the mechanical strength of the composite electrolyte can be increased. Examples of the binder include polyvinylidene fluoride (PVdF) and an acrylic binder. The content of the binder in the composite electrolyte is preferably 3% by weight or less (including 0% by weight). When the content of the binder exceeds this range, the ion conductivity of the electrolyte may be deteriorated to cause deterioration in discharge performance. The kind of the binder can be set to one kind or two kinds or more.

The composite electrolyte is preferably a gel electrolyte. The compositing of a polymer and organic solvent in which a lithium salt is dissolved can provide a gel electrolyte. The gel electrolyte can cover at least a part of the surface of the lithium-containing oxide particles. Preferably, the gel electrolyte uniformly covers the surface of the particles. A gel electrolyte containing an organic solvent having a boiling point of 150° C. or higher is preferable. Thereby, the durability and life performance in a high-temperature environment of the composite electrolyte can be improved.

For example, the composite electrolyte is obtained by mixing an electrolytic composition which contains an organic solvent containing lithium ions, and a polymer with lithium-containing oxide particles, and heat-treating the mixture if needed.

A method for measuring the content of the lithium-containing oxide particles in the composite electrolyte will be described below. The composite electrolyte can be subjected to TG (Thermogravimetry: thermogravimetric analysis) measurement up to 800° C., to measure the content of the lithium-containing oxide particles from the weight reductions of the organic solvent, polymer, and binder.

The composite electrolyte being a gel is confirmed as follows. The gel can be confirmed by applying pressure of 10 g/cm$^2$ to the composite electrolyte, and investigating the presence or absence of the leaching of an organic electrolytic solution.

When the composition or the like of the composite electrolyte contained in the secondary battery is confirmed, the composite electrolyte is removed from the secondary battery by the following method. The secondary battery is disassembled in a glove box filled with argon, and an electrode is removed. The composite electrolyte is peeled off from the removed electrode. Then, the composition or the like of the composite electrolyte is confirmed.

The above first embodiment provides the composite electrolyte containing the lithium-containing oxide particles and the electrolytic composition. The specific surface area of the lithium-containing oxide particles measured by the BET adsorption method using $N_2$ is 10 m$^2$/g to 500 m$^2$/g. The content of the lithium-containing oxide particles in the composite electrolyte is 90% by weight to 98% by weight. Furthermore, the electrolytic composition contains the lithium ions, the organic solvent, and the polymer. According to the composite electrolyte of the embodiment, the lithium ion conductivity can be improved.

Second Embodiment

A second embodiment provides a secondary battery including a positive electrode active material-containing layer, a negative electrode active material-containing layer, and a composite electrolyte. The composite electrolyte is provided between the positive electrode active material-containing layer and the negative electrode active material-containing layer. The composite electrolyte of the first embodiment can be used for the composite electrolyte.

The secondary battery of the embodiment includes a nonaqueous electrolyte secondary battery and a bipolar type secondary battery. The secondary battery of the embodiment can be applied to various secondary batteries such as square-shaped, cylindrical-shaped, flat type, thin type, and coin type batteries. The secondary battery is preferably a secondary battery having a bipolar structure. Thereby, a cell having a voltage equivalent to that of a battery module in which a plural unit cells are connected in series can be advantageously achieved by one cell. Since the composite electrolyte of the embodiment can take a gel-like form, it can prevent a short circuit caused via an electrolytic solution in a bipolar cell.

The nonaqueous electrolyte secondary battery can include a container member, a positive electrode housed in the container member and containing a positive electrode active material-containing layer, a negative electrode housed in the container member and containing a negative electrode active material-containing layer, and a composite electrolyte layer disposed between the positive electrode active material-containing layer and the negative electrode active material-containing layer. The negative electrode, the positive electrode, the container member, and the composite electrolyte layer will be described.

(Negative Electrode)

This negative electrode includes a negative electrode current collector and a negative electrode active material-containing layer provided on one or both surfaces of the current collector and containing an active material, a conductive agent, and a binder.

The negative electrode active material is not particularly limited as long as the negative electrode active material can allow lithium or lithium ions to be inserted in and extracted from. Examples thereof include a carbon material, a graphite material, a lithium alloy, a metal oxide, and a metal sulfide. The kind of the negative electrode active material to be used can be set to one kind or two kinds or more. The negative electrode active material preferably contains a titanium-containing oxide. Since the aluminum foil that can be used for a positive electrode current collector is able to be used for a negative electrode current collector in place of a copper foil by using the titanium-containing oxide, a reduction in weight and a reduction in cost can be achieved. The titanium-containing oxide desirably has a lithium ion inserting-extracting potential of 1 to 3 V (vs. Li/Li$^+$) with reference to a Li potential. Examples of the titanium-containing oxide satisfying this condition include a lithium titanium oxide, a titanium oxide, a niobium titanium oxide, and a sodium niobium titanium oxide. The titanium-containing oxide desirably includes at least one selected from the group consisting of a lithium titanium oxide having a spinel structure, a monoclinic titanium oxide, and a niobium titanium oxide.

Examples of the lithium titanium oxide include a lithium titanium oxide having a spinel structure (for example, the general formula $Li_{4+x}Ti_5O_{12}$ ($-1 \leq x \leq 3$)), a lithium titanium oxide having a ramsdellite structure (for example, $Li_{2+x}Ti_3O_7$ ($-1 \leq x \leq 3$), $Li_{1+x}Ti_2O_4$ ($0 \leq x \leq 1$), $Li_{1.1+x}Ti_{1.8}O_4$ ($0 \leq x \leq 1$), and $Li_{1.07+x}Ti_{1.86}O_4$ ($0 \leq x \leq 1$)).

Examples of the titanium oxide include a titanium oxide having a monoclinic structure (for example, an uncharged structure is $TiO_2$ (B)) and $Li_xTiO_2$ ($0 \leq x$), a titanium oxide having a rutile structure (for example, an uncharged structure is $TiO_2$ and $Li_xTiO_2$ ($0 \leq x$)), and a titanium oxide having an anatase structure (for example, an uncharged structure is $TiO_2$ and $Li_xTiO_2$ ($0 \leq x$)).

Examples of the niobium titanium oxide include one represented by $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, and M is at least one element selected from the group consisting of Fe, V, Mo, and Ta). One kind or two or more kinds of the element can be used.

Examples of the sodium niobium titanium oxide include an orthorhombic Na-containing niobium titanium composite oxide represented by the general formula $Li_{2+v}Na_{2-w}M1_xTi_{6-y-z}Nb_yM2_zO_{14+\delta}$ ($0 \geq v \leq 4$, $0 < w < 2$, $0 \leq x < 2$, $0 < y \leq 6$, $0 \leq z < 3$, $-0.5 \leq \delta \leq 0.5$; M1 contains at least one selected from Cs, K, Sr, Ba, and Ca; and M2 contains at least one selected from Zr, Sn, V, Ta, Mo, W, Fe, Co, Mn, and Al). One kind or two or more kinds of the element can be used.

The negative electrode active material is preferably a lithium titanium oxide having a spinel structure. The lithium titanium oxide having a spinel structure provides less volume change during charge and discharge. Since the aluminum foil that is able to be used for a positive electrode current collector can be used for a negative electrode current collector in place of a copper foil, a reduction in weight and a reduction in cost can be achieved. Furthermore, the lithium titanium oxide having a spinel structure becomes advantageous to an electrode structure having a bipolar structure. The content of the negative electrode active material other than the titanium-containing oxide based on the whole negative electrode active material is desirably 50% by weight or less.

Particles made of the titanium-containing oxide may contain independent primary particles, secondary particles as an aggregate of the primary particles, or both the independent primary particles and the secondary particles.

The average particle size (diameter) of the secondary particles can be set to 2 μm or more, and preferably more than 5 μm. More preferably, the average particle size is 7 to 20 μm. This range can produce a negative electrode having a high density while keeping the pressing force during producing the negative electrode low, and can suppress the stretch of an aluminum-containing current collector. The secondary particles made of the titanium-containing oxide are obtained by making an active material precursor having an average particle size of 1 μm or less by the reaction and synthesis of raw active materials, subjecting the active material precursor to a firing treatment, and then grinding treatment using a grinder such as a ball mill or a jet mill, and then aggregating the active material precursor in the firing treatment to grow it into secondary particles having a larger particle size.

The average particle size (diameter) of the primary particles is desirably set to 1 μm or less. As a result of this, the effect in terms of high input performance (quick charge performance) is remarkable. The reason for this is that, for example, the diffusion distance of lithium ions in the active material is shortened, and the specific surface area is increased. The average particle size is more preferably 0.1 to 0.8 μm. In the negative electrode active material-containing layer, the secondary particles and primary particles made of the titanium-containing oxide may be mixed. From the viewpoint of further increasing the density, the content of the primary particles existing in the negative electrode active material-containing layer is preferably 5 to 50% by volume.

At least a part of the surface of the particles made of the titanium-containing oxide is desirably covered with a carbon material layer. Thereby, the resistance of the negative electrode can be reduced. At least a part of the surface of the particles made of the titanium-containing oxide can be covered with the carbon material layer by adding a carbon material precursor during producing the secondary particles, and firing the particles in an inert atmosphere at 500° C. or higher.

The average particle size of the particles made of the titanium-containing oxide is 1 μm or less, and the specific surface area measured by the BET method based on $N_2$ adsorption is desirably 3 to 200 m$^2$/g. This can further improve the affinity of the negative electrode with the nonaqueous electrolyte.

The negative electrode current collector is desirably an aluminum foil or an aluminum alloy foil. The thicknesses of the aluminum foil and aluminum alloy foil are preferably 20 μm or less, and more preferably 15 μm or less. The purity of the aluminum foil may be from 98% by weight to pure aluminum (purity: 100%), and preferably 99.99% by weight or more. Preferable examples of the aluminum alloy include aluminum alloys containing at least one element selected from the group consisting of iron, magnesium, manganese, zinc, and silicon. On the other hand, the content of transition metals such as nickel and chromium is preferably set to 100 weight ppm or less (including 0 weight ppm). For example, an Al—Fe alloy, an Al—Mn-based alloy, and an Al—Mg-based alloy can provide higher strength than that of aluminum. On the other hand, an Al—Cu-based alloy increases strength, but does not provide excellent corrosion resistance.

The aluminum purity of the current collector can be set to be 98% by weight to 99.95% by weight. Since the combination of the secondary particles made of the titanium-containing oxide with the negative electrode current collector having such an aluminum purity can provide a reduction in the pressing force of the negative electrode to decrease the stretch of the current collector, this purity range is suitable. As a result, the electron conductivity of the current collector can be advantageously improved. Furthermore, the cracking of the secondary particles made of the titanium-containing oxide can be suppressed to produce a low-resistance negative electrode.

The specific surface area of the negative electrode is preferably 3 to 50 m$^2$/g, more preferably 5 to 50 m$^2$/g, and still more preferably 1 to 20 m$^2$/g. This range suppresses the reductive decomposition of the nonaqueous electrolyte in a high-temperature environment to improve a cycle life.

Herein, the specific surface area of the negative electrode means a surface area per 1 g of the negative electrode active material-containing layer (excluding the weight of the current collector). The negative electrode active material-containing layer may be a porous layer containing a negative electrode active material, a conductive agent, and a binder.

The porosity of the negative electrode (excluding the current collector) is desirably set to 20 to 50%. This makes it possible to obtain a negative electrode having excellent affinity to the nonaqueous electrolyte and a high density. The porosity is more preferably 25 to 40%.

As the conductive agent, for example, a carbon material, a metal compound powder, and a metal powder or the like can be used. Examples of the carbon material include acetylene black, carbon black, coke, carbon fiber, and graphite. The carbon material preferably has a BET specific surface area of 10 m$^2$/g or more based on N$_2$ adsorption. Examples of the metal compound powder include TiO, TiC, and TiN powders. Examples of the metal powder include Al, Ni, Cu, and Fe powders. Preferable examples of the conductive agent include coke heat-treated at a heat treatment temperature of 800° C. to 2000° C. and having an average particle size of 10 μm or less, graphite, acetylene black, carbon fiber having an average fiber diameter of 1 μm or less, and a TiO powder. One or more selected from these can achieve a reduction in electrode resistance and an improvement in cycle life performance. The kind of the conductive agent can be set to one kind or two kinds or more.

Examples of the binder include polytetrafluoroethylene (PTFE), polyvinylidene fluoride (PVdF), fluorine rubber, acrylic rubber, styrene butadiene rubber, a core-shell binder, and polyimide. The kind of the binder can be set to one kind or two kinds or more.

The proportions of the negative electrode active material, conductive agent, and binder are preferably as follows: the negative electrode active material: 80 to 95% by weight, the conductive agent: 3 to 18% by weight, and the binder: 2 to 7% by weight.

The negative electrode is produced, for example, by suspending negative electrode active material particles, a conductive agent, and a binder in a proper solvent, and applying this suspension to a current collector, followed by drying and pressing (for example, pressing under heating).

(Positive Electrode)

This positive electrode includes a positive electrode current collector and a positive electrode active material-containing layer provided on one or both surfaces of the current collector and containing an active material, a conductive agent, and a binder.

A positive electrode active material which can allow lithium or lithium ions to be inserted in and extracted from may be used. Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, lithium containing iron-based fluorosulfate, and a phosphate compound having an olivine crystal structure (for example, Li$_x$FePO$_4$ (0≤x≤1), and Li$_x$MnPO$_4$ (0≤x≤1)). The phosphate compound having an olivine crystal structure has excellent thermal stability.

Examples of a positive electrode active material providing a high positive electrode potential will be described below. Examples thereof include lithium manganese composite oxides such as Li$_x$Mn$_2$O$_4$ (0<x≤1) and Li$_x$MnO$_2$ (0<x≤1), lithium nickel aluminum composite oxides such as Li$_x$Ni$_{1-y}$Al$_y$O$_2$ (0<x≤1, 0<y≤1), lithium cobalt composite oxides such as Li$_x$CoO$_2$ (0<x≤1), lithium nickel cobalt composite oxides such as Li$_x$Ni$_{1-y-z}$Co$_y$Mn$_z$O$_2$ (0<x≤1, 0<y≤1, 0≤z≤1), lithium manganese cobalt composite oxides such as Li$_x$Mn$_y$Co$_{1-y}$O$_2$ (0<x≤1, 0<y≤1), spinel type lithium manganese nickel composite oxides such as Li$_x$Mn$_{2-y}$Ni$_y$O$_4$ (0<x≤1, 0<y<2), lithium phosphorus oxides having an olivine structure such as Li$_x$FePO$_4$ (0<x≤1), Li$_x$Fe$_{1-y}$Mn$_y$PO$_4$ (0<x≤1, 0≤y≤1), Li$_x$CoPO$_4$ (0<x≤1), and iron-based fluorosulfate (for example, Li$_x$FeSO$_4$F (0<x≤1)).

The lithium nickel aluminum composite oxide, the lithium nickel cobalt manganese composite oxide, and the lithium manganese cobalt composite oxide can suppress the reaction with the nonaqueous electrolyte in a high-temperature environment, whereby the battery life can be markedly improved. The lithium nickel cobalt manganese composite oxide which can be represented by Li$_x$Ni$_{1-y-z}$Co$_y$Mn$_z$O$_2$ (0<x≤1.1, 0<y≤0.5, 0<z≤0.5) is advantageous in terms of the durability life under high temperature.

As the positive electrode active material, there can be used a phosphate compound having an olivine structure which can be represented by Li$_x$Fe$_{1-y-z}$Mn$_y$M$_z$PO$_4$ (M is at least one element selected from the group consisting of Mg, Al, Ti, and Zr, and 0≤x≤1.1, 0≤y≤1, and 0≤z≤0.2 are set). The positive electrode active material improves the thermal stability of the secondary battery to improve the cycle life performance of the secondary battery in a high-temperature environment. In Li$_x$Fe$_{1-y-z}$Mn$_y$M$_z$PO$_4$, y is preferably 0.5 to 1, and more preferably 0.7 to 0.9. This range provides an increase in a positive electrode voltage, which provides an increase in an energy density and an improvement in electron conductivity to provide an improvement in large current performance. M is at least one element selected from the group consisting of Mg, Al, Ti, and Zr, and z is preferably 0 to 0.1, and more preferably 0.01 to 0.08, which suppresses the dissolution of Mn and Fe during a high temperature cycle (for example, 45° C. or higher) to provide a large improvement in high temperature cycle performance.

The phosphate compound having an olivine structure which can be represented by Li$_x$Fe$_{1-y-z}$Mn$_y$M$_z$PO$_4$ is preferably LiMn$_{0.85}$Fe$_{0.1}$Mg$_{0.05}$PO$_4$ and LiFePO$_4$. At least a part of the surface of particles made of a lithium phosphate compound having an olivine structure is preferably covered with a carbon material layer in order to provide low resistance and an improvement in life performance.

The particles made of the positive electrode active material may contain independent primary particles, secondary particles as an aggregate of the primary particles, and both the independent primary particles and the secondary particles.

The average particle size (diameter) of the primary particles made of the positive electrode active material is 1 μm or less, and more preferably 0.05 to 0.5 μm. At least a part of the surface of the particles made of the positive electrode active material is preferably covered with a carbon material. The carbon material can take a layer structure, a particle structure, or an aggregate form of particles.

Examples of a positive electrode current collector include an aluminum foil and an aluminum alloy foil. The aluminum purity of the positive electrode current collector can be set to from 99% by weight to pure aluminum (purity: 100%). The aluminum purity is more preferably from 99% by weight to 99.99% by weight. Within this range, deterioration in the high temperature cycle life caused by the dissolution of impurity elements can be reduced. An aluminum alloy is preferably an alloy containing an aluminum component and one or more elements selected from the group consisting of iron, magnesium, zinc, manganese, and silicon. For example, an Al—Fe alloy, an Al—Mn-based alloy, and an Al—Mg-based alloy can provide higher strength than that of aluminum. On the other hand, the content of transition metals such as nickel or chromium in each of the aluminum foil and aluminum alloy foil is preferably set to 100 weight ppm or less (including 0 weight ppm). An Al—Cu-based alloy has high strength, but has insufficient corrosion resistance.

Examples of the conductive agent for improving the electron conductivity and suppressing the contact resistance to the collector include acetylene black, carbon black, graphite, and a carbon fiber having an average fiber diameter of 1 µm or less. The kind of the conductive agent can be set to one kind or two kinds or more.

Examples of the binder for binding the active material with the conductive agent include polytetrafluoroethylene (PTFE), polyvinylidene fluoride (PVdF), and fluorine rubber. The kind of the binder can be set to one kind or two kinds or more.

The proportions of the positive electrode active material, conductive agent, and binder are preferably as follows: the positive electrode active material: 80 to 95% by weight, the conductive agent: 3 to 18% by weight, and the binder: 2 to 7% by weight. When the proportion of the conductive agent is 3% by weight or more, the above-described effect can be achieved, and when 18% by weight or less, the decomposition of the nonaqueous electrolyte on the conductive agent surface during storage at high temperatures can be reduced. When the proportion of the binder is 2% by weight or more, sufficient electrode strength is provided, and when 7% by weight or less, the insulating part of the electrode can be decreased.

The positive electrode is produced, for example, by suspending positive electrode active material particles, a conductive agent, and a binder in a proper solvent, and applying this suspension to a positive electrode current collector, followed by drying and pressing. The positive electrode pressing force is preferably 0.15 ton/mm to 0.3 ton/mm. When the pressing force is within this range, adhesion (peel strength) between the positive electrode active material-containing layer and the aluminum-containing positive electrode current collector is increased, and the percent stretch of the positive electrode current collector is 20% or less, which is preferable.

(Container Member)

Examples of the container member include a laminate film container and a metal container. The shape of the container conforms to the form of the secondary battery such as a nonaqueous electrolyte secondary battery. Examples of the form of the secondary battery such as the nonaqueous electrolyte secondary battery include flat, square, cylindrical, coin, button, sheet, laminated, and large-size batteries mounted on electric vehicles.

The thickness of the laminate film is preferably 0.5 mm or less, and more preferably 0.2 mm or less. The lower limit of the thickness of the laminate film is desirably 0.01 mm.

On the other hand, the plate thickness of the metal container is preferably 0.5 mm or less, and more preferably 0.3 mm or less. The lower limit of the plate thickness of the metal container is preferably 0.05 mm.

Examples of the laminate film include a multilayer film including a metal layer and a resin layer for coating the metal layer. For reduction in weight, the metal layer is preferably an aluminum foil or an aluminum alloy foil. The purity of the aluminum foil is preferably 99.5% by weight or more. The resin layer is intended to reinforce the metal layer, and can be formed from polymers such as polypropylene (PP), polyethylene (PE), nylon, and polyethylene terephthalate (PET).

The laminate film container is obtained by, for example, sealing the laminate film through thermal fusion bonding.

As the metal container, a square-shaped or cylindrical-shaped metal can made of aluminum, an aluminum alloy, iron or stainless steel can be used. The metal container is desirably made of aluminum or an aluminum alloy. The aluminum alloy is preferably an alloy containing at least one element selected from the group consisting of manganese, magnesium, zinc, and silicon. The aluminum purity of the alloy is preferably 99.8% by weight or less. The thickness of the can can be reduced by increasing the strength of the metal can made of an aluminum alloy. As a result, a thin, light-weight, and high power battery having an excellent heat releasing property can be achieved.

The metal container may be sealed by laser. As a result of this, the volume of the sealing part can be made less than that of the laminate film container, and the energy density can be improved.

The secondary battery may not include a separator.

The separator can be disposed between the positive electrode and the negative electrode. Examples of the separator include a non-woven fabric made of a synthetic resin, a porous film, and a non-woven fabric made of cellulose. The porous film can be made of polyolefin such as polyethylene or polypropylene.

The separator is preferably a non-woven fabric or porous film having a thickness of 30 µm or less and a porosity of 50% or more and containing cellulose and/or polyolefin. A separator made of a cellulose fiber and having a porosity of 60% or more is preferably used. The separator preferably has a fiber diameter of 10 µm or less. Examples of the form of the separator include a non-woven fabric, film, and paper. When the cellulose fiber separator has a porosity of 60% or more, the impregnation properties of the nonaqueous electrolyte are good. High output performance from low to high temperatures can be attained. The porosity is more preferably 62% to 80%. When the fiber diameter is set to 10 µm or less, the affinity of the separator with the nonaqueous electrolyte is improved. Thus, the battery resistance can be reduced. More preferably, the fiber diameter is 3 µm or less.

The separator preferably has a thickness of 20 to 100 µm and a density of 0.2 to 0.9 g/cm$^3$. When these items are in the above ranges, the balance between mechanical strength and a reduction in battery resistance can be kept and therefore, a battery which has high output and is reduced in the development of an internal short circuit can be provided. The heat-shrinkage in a high-temperature environment is reduced and excellent high-temperature storage performance can be attained.

An example of a nonaqueous electrolyte secondary battery of an embodiment will be described with reference to FIGS. 1 to 5.

An example of a nonaqueous electrolyte secondary battery using a metal container is shown in FIGS. 1 and 2.

An electrode group 1 is housed in a rectangular cylindrical metal container 2. The electrode group 1 has a structure in which a composite electrolyte layer 5 is interposed between a positive electrode active material-containing layer of a positive electrode 3 and a negative electrode active material-containing layer of a negative electrode 4 and these are spirally wound to form a flat shape. A separator holding a composite electrolyte can be used in place of the composite electrolyte layer. As shown in FIG. 2, strip-shaped positive electrode leads 6 are electrically connected at a plural places of the end of the positive electrode 3 which are located on the end surface of the electrode group 1. Strip-shaped negative electrode leads 7 are electrically connected at a plural places of the end of the negative electrode 4 which are located on the end surface. A bundle of the positive electrode leads 6 is electrically connected to a positive electrode conductive tab 8. A positive electrode terminal is formed of the positive electrode leads 6 and the positive electrode conductive tab 8. A bundle of the negative electrode leads 7 is connected to a negative electrode conductive tab 9. A negative electrode terminal is formed of the negative electrode leads 7 and the negative electrode conductive tab 9. A metal sealing plate 10 is fixed to the opening part of a metal container 2 by welding or the like. The positive electrode conductive tab 8 and the negative electrode conductive tab 9 are pulled out from pick-up holes formed in the sealing plate 10 to the outside. The inner periphery surface of each pick-up hole of the sealing plate 10 is covered with an insulating member 11 in order to prevent a short circuit due to the contact of the positive electrode conductive tab 8 and sealing plate 10 or the contact of the sealing plate 10 and negative electrode conductive tab 9.

An example of a nonaqueous electrolyte secondary battery using a laminate film container member is shown in FIGS. 3 and 4.

As shown in FIGS. 3 and 4, a flat type wound electrode group 1 is housed in a baggy container member 12 made of a laminate film obtained by interposing a metal layer between two resin films. The wound electrode group 1 having a flat form is formed by spirally winding a laminate obtained by laminating a negative electrode 4, a composite electrolyte layer 5, a positive electrode 3, and a composite electrolyte layer 5 in this order from the outside, and press-molding the wound laminate. The outermost negative electrode 4 has a structure in which a negative electrode layer (negative electrode active material-containing layer) 4b containing a negative electrode active material is formed on one inside surface of a negative electrode current collector 4a as shown in FIG. 4. Another negative electrodes 4 each have a structure in which a negative electrode layer 4b is formed on each surface of the current collector 4a. The positive electrode 3 has a structure in which a positive electrode layer (positive electrode active material-containing layer) 3b is formed on each surface of the positive electrode current collector 3a.

In the vicinity of the outer peripheral end of the wound electrode group 1, a negative electrode terminal 13 is connected to the negative electrode current collector 4a of the outermost negative electrode 4, and a positive electrode terminal 14 is connected to the positive electrode current collector 3a of the inside positive electrode 3. The negative electrode terminal 13 and the positive electrode terminal 14 are externally extended from the opening part of the baggy container member 12. The wound electrode group 1 is sealed by heat-sealing the opening part of the baggy container member 12. When the opening part is heat-sealed, the negative electrode terminal 13 and the positive electrode terminal 14 are pinched by the baggy container member 12 in the opening part.

The composite electrolyte layer is produced by the following method, for example. Lithium-containing oxide particles are dispersed in a binder solution. The obtained dispersion liquid is applied or sprayed onto one surface or both surfaces of at least one electrode of the positive electrode and the negative electrode, and then dried to form a layer containing the lithium-containing oxide particles. An electrolytic composition which contains an organic solvent containing lithium ions, and a polymer is injected into the container in which the electrode group is housed, to impregnate the voids of the positive electrode and negative electrode with the electrolytic composition. Then, the composite electrolyte layer is formed between the positive electrode active material-containing layer and the negative electrode active material-containing layer by covering the opening part of the container with a sealing plate or placing the container in an inactive atmosphere without providing the sealing plate, and heat-treating the container at 60° C. to 80° C.

The composite electrolyte layer can be formed by a method to be described later in place of the above method. A composition which contains lithium-containing oxide particles, a binder, and an organic solvent containing lithium ions, and a polymer is applied or sprayed onto one surface or both surfaces of at least one electrode of the positive electrode and the negative electrode, then dried, and heat-treated at 60° C. to 80° C., to form the composite electrolyte layer between the positive electrode active material-containing layer and the negative electrode active material-containing layer.

Next, a secondary battery having a bipolar structure will be described. The secondary battery further includes a current collector having a first surface and a second surface positioned opposite to the first surface. As the current collector, the positive electrode current collector or negative electrode current collector that can be used for a nonaqueous electrolyte secondary battery can be used. The secondary battery has a bipolar structure in which a positive electrode active material-containing layer is formed on the first surface of the current collector and a negative electrode active material-containing layer is formed on the second surface. The composite electrolyte of the first embodiment exists between the positive electrode active material-containing layer and the negative electrode active material-containing layer. The same positive electrode active material-containing layer and negative electrode active material-containing layer as those described in the nonaqueous electrolyte secondary battery can be used.

The composite electrolyte of the first embodiment improves the ion conductivity of the secondary battery having the bipolar structure. Thereby, a high voltage secondary battery can be achieved by one unit cell without connecting a plural unit cells in series. Furthermore, the composite electrolyte can take a gel-like form, which can prevent a short circuit caused via an electrolytic solution in a bipolar cell.

An example of the bipolar type secondary battery is shown in FIG. 5. The secondary battery shown in FIG. 5 includes a metal container 31, an electrode body 32 having a bipolar structure, a sealing plate 33, a positive electrode terminal 34, and a negative electrode terminal 35. The metal container 31 has a bottomed square cylindrical shape. The same metal container as that described in the nonaqueous electrolyte secondary battery can be used. The electrode body 32 having the bipolar structure includes a current collector 36, a positive electrode layer (positive electrode active material-containing layer) 37 laminated on one surface (first surface) of the current collector 36, and a negative electrode layer (negative electrode active material-containing layer) 38 laminated on the other surface (second surface) of the current collector 36. A composite electrolyte layer 39 is disposed between the bipolar structure electrode bodies 32. Each of the positive electrode terminal 34 and the negative electrode terminal 35 is fixed to the sealing plate 33 with an insulating member 42 sandwiched therebetween.

One end of a positive electrode lead 40 is electrically connected to the positive electrode terminal 34, and the other end of the positive electrode lead 40 is electrically connected to the current collector 36. One end of a negative electrode lead 41 is electrically connected to the negative electrode terminal 35, and the other end of the negative electrode lead 41 is electrically connected to the current collector 36.

A battery module and battery pack including the secondary battery of the second embodiment are also included in the range of the present application. The embodiment of the battery pack is appropriately changed according to the use. The battery pack is preferably used for an application which requires charge and discharge at a high current. Specific examples thereof include a power source for digital cameras, for vehicles such as two- or four-wheel hybrid electric vehicles, for two- or four-wheel electric vehicles, and for assisted bicycles. It is particularly appropriate for use as a battery for a vehicle such as an automobile.

Examples of the battery module include those including a plural unit cells which are electrically connected in series or parallel, and those including a unit including a plural unit cells which are electrically connected in series, or another unit including a plural unit cells which are electrically connected in parallel.

Examples of the form of serial or parallel electrical connection of a plural secondary batteries include serial or parallel electrical connection of a plural batteries each having a container member, and serial or parallel electrical connection of a plural electrode groups or bipolar type electrode bodies housed in a common case. According to a specific example of the former, positive and negative electrode terminals of a plural secondary batteries are connected by a metal bus bar (for example, aluminum, nickel, and copper). According to a specific example of the latter, a plural electrode groups or bipolar type electrode bodies are housed in one case electrochemically insulated by a partition wall, and these electrode groups or electrode bodies are electrically connected in series. When the number of the batteries electrically connected in series is set to 5 to 7 in the case of the nonaqueous electrolyte secondary battery, appropriate voltage compatibility with a lead storage battery is achieved. In order to further improve the voltage compatibility for the lead storage battery, five or six unit cells are preferably connected in series.

As a case which houses the battery module, a metal can made of an aluminum alloy, iron or stainless steel, a plastic container or the like can be used. The plate thickness of the container is desirably set to 0.5 mm or more.

An example of the battery module will be described with reference to FIG. 6. A battery module 21 shown in FIG. 6 includes a plural square-shaped nonaqueous electrolyte batteries $22_1$ to $22_5$ shown in FIG. 1 as unit cells. The positive electrode conductive tab 8 of the battery $22_1$ and the negative electrode conductive tab 9 of the battery $22_2$ located next to the battery $22_1$ are electrically connected by a lead 23. Furthermore, the positive electrode conductive tab 8 of the battery $22_2$ and the negative electrode conductive tab 9 of the battery $22_3$ located next to the battery $22_2$ are electrically connected by the lead 23. Thus, the batteries $22_1$ to $22_5$ are connected in series.

Since the secondary battery of the embodiment described above includes the composite electrolyte of the first embodiment, the secondary battery having an excellent charge-and-discharge cycle life, low-temperature performance, and thermal stability can be achieved. An increase in the interface resistance is suppressed without deteriorating the joining of the positive electrode active material-containing layer and composite electrolyte, and the joining of the negative electrode active material-containing layer and composite electrolyte during a charge-and-discharge cycle, to markedly improve the cycle life performance. Thereby, the separator can be eliminated by using the composite electrolyte, and the resistance due to the separator is lost, whereby the discharge performance can be advantageously improved. The thermal stability and the electrochemical stability in a high-temperature environment are improved by using the organic solvent.

Third Embodiment

A battery pack according to a third embodiment can include one or more nonaqueous electrolyte batteries (unit cells) according to the second embodiment. The plural nonaqueous electrolyte batteries can be electrically connected in series, in parallel, or in combination of series and parallel to constitute a battery module. The battery pack according to the third embodiment may include a plural battery modules.

The battery pack according to the third embodiment can further include a protective circuit. The protective circuit has a function for controlling the charge and discharge of a nonaqueous electrolyte battery. Alternatively, a circuit included in an apparatus using the battery pack as a power supply (for example, an electronic device and an automobile or the like) can also be used as the protective circuit of the battery pack.

The battery pack according to the third embodiment can further include a external power distribution terminal. The external power distribution terminal is intended to output a current from the secondary battery to the outside, and/or to input a current into the secondary battery. In other words, when the battery pack is used as a power supply, a current is supplied to the outside through the external power distribution terminal. When the battery pack is charged, a charging current (including the regenerative energy of the power of a vehicle such as an automobile) is supplied to the battery pack through the external power distribution terminal.

Next, an example of a battery pack according to the third embodiment will be described with reference to the drawings.

FIG. 7 is an exploded perspective view of an example of the battery pack according to the third embodiment. FIG. 8 is a block diagram showing an electric circuit of the battery pack of FIG. 7.

A battery pack 50 shown in FIGS. 7 and 8 includes unit cells 51. The unit cells 51 are flat nonaqueous electrolyte batteries described with reference to FIGS. 3 and 4.

Plural unit cells 51 are stacked so that the negative electrode terminals 13 and the positive electrode terminals 14 extended outside are arranged in the same direction, and fastened with an adhesive tape 52 to configure a battery module 53. The unit cells 51 are electrically connected to each other in series as shown in FIG. 8.

A printed wiring board 54 is arranged to face opposite to the side plane of the battery module 53 where the negative electrode terminal 13 and the positive electrode terminal 14 extend out from. A thermistor 55, a protective circuit 56, and an energizing terminal 57 to an external device as the external power distribution terminal are mounted on the printed wiring board 54 as shown in FIG. 8. An electric insulating plate (not shown) is attached to the surface of the printed wiring board 54 facing the battery module 53 to avoid unnecessary connection of the wires of the battery module 53.

A positive electrode-side lead 58 is connected to the positive electrode terminal 14 located at the bottom layer of the battery module 53 and the distal end of the lead 58 is inserted into a positive electrode-side connector 59 of the printed wiring board 54 so as to be electrically connected. A negative electrode-side lead 60 is connected to the negative electrode terminal 13 located at the top layer of the battery module 53 and the distal end of the lead 60 is inserted into an negative electrode-side connector 61 of the printed wiring board 54 so as to be electrically connected. The connectors 59 and 61 are connected to the protective circuit 56 through wires 62 and 63 formed on the printed wiring board 54.

The thermistor 55 detects the temperature of the unit cells 51, and the detection signal is sent to the protective circuit 56. The protective circuit 56 can shut down a plus-side wire 64a and a minus-side wire 64b between the protective circuit 56 and the energizing terminal 57 to an external device under a predetermined condition. The predetermined condition indicates, for example, the case where the temperature detected by the thermistor 55 becomes a predetermined temperature or more. Another example of the predetermined condition indicates the case where the over-charge, over-discharge, or over-current of the unit cells 51 is detected. The detection of the over-charge and the like is performed on each of the unit cells 51 or the entire battery module 53. When each of the unit cells 51 is detected, the cell voltage may be detected, or a positive electrode or negative electrode potential may be detected. In the latter case, a lithium electrode to be used as a reference electrode is inserted into each of the unit cells 51. In the case of the battery pack of FIGS. 7 and 8, wires 65 for voltage detection are connected to each of the unit cells 51. Detection signals are sent to the protective circuit 56 through the wires 65.

Protective sheets 66 made of rubber or resin are arranged on three side planes of the battery module 53 except the side plane from which the positive electrode terminal 14 and the negative electrode terminal 13 protrude out from.

The battery module 53 is housed in a housing container 67 together with each of the protective sheets 66 and the printed wiring board 54. That is, the protective sheets 66 are arranged on both internal surfaces in a long side direction and on one internal surface in a short side direction of the housing container 67. The printed wiring board 54 is arranged on the internal surface on the opposite side in a short side direction. The battery module 53 is located in a space surrounded by the protective sheets 66 and the printed wiring board 54. A lid 68 is attached to the upper surface of the housing container 67.

In order to fix the battery module 53, a heat-shrinkable tape may be used in place of the adhesive tape 52. In this case, the battery module is bound by placing the protective sheets on the both sides of the battery module, revolving the heat-shrinkable tape, and thermally shrinking the heat-shrinkable tape.

In FIGS. 7 and 8, the form in which the unit cells 51 are connected in series is shown. However, in order to increase the battery capacity, the cells may be connected in parallel. Alternatively, the cells may be formed by combining series connection and parallel connection. The assembled battery pack can be connected in series or in parallel.

In FIGS. 7 and 8, a battery pack including one battery module has been described; however, a battery pack according to the third embodiment may also include plural battery modules. The plural battery modules may be electrically connected in series and/or in parallel.

The aspect of the battery pack according to the third embodiment may be appropriately changed depending on its application. The battery pack according to the third embodiment can be suitably used in applications in which cycle performance is demanded to be excellent when a large current is taken out. Specifically the battery pack is used as a power source for a digital camera, or for example, a battery for mounting on a vehicle such as a two- or four-wheeled hybrid electric automobiles, a two- or four-wheeled electric automobiles, a power-assisted bicycle or electric trains. In particular, the battery pack is suitably used for a battery mounted on a vehicle.

In the vehicle on which the battery pack according to the third embodiment is mounted, the battery pack is configured to recover the regenerative energy of the power of the vehicle, for example. Examples of the vehicle include two to four-wheeled hybrid electric automobiles, two to four-wheeled electric automobiles, electric assist bicycles, and electric trains.

An automobile as an example including a battery pack as an example according to a third embodiment is shown in FIG. 9.

In an automobile 71 shown in FIG. 9, a battery pack 72 as an example according to the third embodiment is mounted in an engine room located in the front part of a vehicle body. The mounting position of the battery pack in the automobile is not limited to the engine room. For example, the battery pack can also be mounted in the rear part of the vehicle body of the automobile or under a seat of the automobile.

Since the battery pack of the third embodiment includes the secondary battery of the second embodiment, the battery pack having an excellent charge-and-discharge cycle life, low-temperature performance, and thermal stability can be achieved.

EXAMPLES

Examples of the present invention will be hereinafter described in detail with reference to the drawings.

However, the present invention is not limited thereto.

Example 1

A positive electrode active material Was prepared, which contained $LiMn_{0.85}Fe_{0.1}Mg_{0.05}PO_4$ secondary particles having an olivine structure and having an average primary particle size of 50 nm. Carbon material particles having an average particle size of 5 nm adhered in an adhesion amount of 0.1% by weight to the surface of the secondary particles.

To this positive electrode active material, 3% by weight of carbon fibers produced by a vapor phase deposition method and having an average fiber diameter of 0.1 μm and 5% by weight of a graphite powder based on the total weight of a positive electrode as conductive agents, and 5% by weight of PVdF based on the total weight of the positive electrode as a binder were added, and those were dispersed in an n-methylpyrrolidone (NMP) solvent to prepare a positive electrode slurry. The obtained slurry was applied onto both surfaces of an aluminum alloy foil (purity: 99% by weight) having a thickness of 15 μm, followed by drying to form a positive electrode active material-containing layer. Then, through a pressing step, a positive electrode was produced, which had a positive electrode active material-containing layer formed on each surface and having a thickness of 67 μm and a density of 2.2 g/cm$^3$.

$Li_4Ti_5O_{12}$ particles were prepared as a negative electrode active material. The $Li_4Ti_5O_{12}$ particles had an average primary particle size of 0.6 μm and had a BET specific surface area of 10 m$^2$/g based on N$_2$ adsorption. The negative electrode active material, a graphite powder having an average particle diameter of 6 μm as a conductive agent, and PVdF as a binder were mixed in a weight ratio of 95:3:2 and those were dispersed in an n-methylpyrrolidone (NMP) solvent. The obtained dispersion was stirred at 1000 rpm for 2 hours by using a ball mill to prepare a negative electrode slurry. The obtained slurry was applied onto an aluminum alloy foil (purity: 99.3% by weight) having a thickness of 15 μm, followed by drying to form a negative electrode active material-containing layer. Then, through a heat pressing step, a negative electrode was produced, which had one surface on which the negative electrode active material-containing layer having a thickness of 59 μm and having a density of 2.2 g/cm$^3$ was formed. The porosity of the negative electrode excluding a current collector was 35%.

Garnett type $Li_7La_3Zr_2O_{12}$ particles which had an average primary particle size (diameter) of 0.1 μm and had a BET specific surface area of 50 m$^2$/g based on N$_2$ adsorption, a nonaqueous electrolytic solution prepared by dissolving of $LiPF_6$ in a mixed solvent of propylene carbonate (PC) and diethyl carbonate (DEC), the volume mixing ratio 1:2, in an amount of 1.0 mol/L, polyacrylonitrile (PAN), and a PVdF binder were mixed in a weight ratio of 95:2.5:0.7:1.8 for compositing. The obtained composition was applied onto the surfaces of the positive electrode active material-containing layer of the positive electrode and negative electrode active material-containing layer of the negative electrode, and heat-treated at 60° C. for 24 hours, to form a gel composite electrolyte layer having a thickness of 5 μm.

The negative electrode and the positive electrode were stacked so that the negative electrode faces the positive electrode to produce an electrode group. The electrode group was housed in a thin metal can made of an aluminum alloy (aluminum purity: 99% by weight) having a thickness of 0.25 mm.

Then, a sealing plate was attached to the opening part of the metal can, to obtain a square-shaped nonaqueous electrolyte secondary battery having a structure shown in FIG. 1 and having a thickness of 13 mm, a width of 62 mm, and a height of 96 mm.

Examples 2 to 20 and Comparative Examples 1 to 8

A nonaqueous electrolyte secondary battery was produced in the same manner as in Example 1 except that the positive electrode active material, the negative electrode active material, the composition and specific surface area of the lithium-containing oxide, the composition (% by weight) in the composite electrolyte, and the compositions of the polymer and organic solvent were changed as shown in the following Tables 1 to 3. In Comparative Example 6, a separator made of polyethylene and having a porosity of 45% was used in place of the composite electrolyte layer, and a nonaqueous electrolytic solution having the same composition as that of Example 1 was used. In Comparative Example 7, a solid electrolyte layer made of 50% by weight of $Li_{1.5}Al_{0.5}Ge_{1.5}(PO_4)_3$, 5% by weight of $LiClO_4$, and 45% by weight of PEO was used in place of the composite electrolyte layer. On the other hand, in Comparative Example 8, a gel electrolyte layer was used, which was made of 2.5% by weight of an electrolytic solution obtained by dissolving 1 M of $LiPF_6$ in an organic solvent containing EC and DEC at 3:7, 0.7% by weight of PAN, 1.8% by weight of a binder, and 95% by weight of $Li_7La_3Zr_2O_{12}$.

The mixing ratio (% by weight) of the lithium-containing oxide particles, nonaqueous electrolytic solution, polymer, and binder in the composite electrolytes of Examples 1 to 20 are shown in Table 3.

The obtained secondary batteries of Examples 1 to 16 and 18 to 20 and Comparative Examples 1 to 6 were charged to 2.9 V at a constant current of 4 A at 25° C., then charged at a constant voltage of 2.9 V, and completed at a current of 0.05 A. Then, the discharge capacities of the secondary batteries in a discharge operation carried out at 4 A to 1.5 V were measured, and used as discharge capacities at 25° C. A capacity retention ratio in a discharge operation carried out at 5 C (20 A) (a capacity obtained in a discharge operation carried out at a current of 0.8 A (equivalent to 0.2 C) was defined as 100) was measured as the large current discharge performance. Furthermore, a discharge capacity in a discharge operation carried out at 4 A (equivalent to 1 C) at −20° C. was measured, and the capacity retention ratio with respect to the discharge capacity at 25° C. was calculated to obtain a discharge capacity retention ratio at −20° C. In a high temperature cycle test at 60° C., the cycle of charging the secondary batteries to a voltage of 2.9 V at a constant current of 4 A in an environment of 60° C., and then discharging the secondary batteries at 4 A to 1.5 V was repeated, and the case where the capacity reached 80% of the initial capacity was defined as a cycle life.

The obtained secondary batteries of Example 17 and Comparative Examples 7 and 8 were charged to 4.2 V at a constant current of 4 A at 25° C., then charged at a constant voltage of 3.0 V, and completed at a current of 0.05 A. Then, the discharge capacities of the secondary batteries in a discharge operation carried out at 4 A to 3 V were measured, and used as discharge capacities at 25° C. A capacity retention ratio in a discharge operation carried out at 5 C (20 A) (the capacity obtained in a discharge operation carried out at a current of 0.8 A (0.2 C) was defined as 100) was measured as the large current discharge performance. Furthermore, a discharge capacity in a discharge operation carried out at 4 A at −20° C. was measured, and a capacity retention ratio with respect to the discharge capacity at 25° C. was measured to obtain a discharge capacity retention ratio at −20° C. In a high temperature cycle test at 60° C., the cycle of charging the secondary batteries to a voltage of 4.2 V at a constant current of 4 A in an environment of 60° C., and then discharging the secondary batteries at 4 A to 3 V was repeated, and the case where the capacity reached 80% of the initial capacity was defined as a cycle life.

These measurement results are shown in the following Tables 4 and 5. The average voltages of the secondary batteries of Examples and Comparative Examples are described together in Tables 4 and 5.

TABLE 1

| | Positive electrode active material | Negative electrode active material | Lithium-containing oxide Composition | Specific surface area ($m^2/g$) | Polymer-organic solvent |
|---|---|---|---|---|---|
| Example 1 | $LiMn_{0.85}Fe_{0.1}Mg_{0.05}PO_4$ | $Li_4Ti_5O_{12}$ | $Li_7La_3Zr_2O_{12}$ | 50 | PAN-PC/DEC(1:2) |
| Example 2 | $LiMn_{0.85}Fe_{0.1}Mg_{0.05}PO_4$ | $TiO_2(B)$ | $Li_7La_3Zr_2O_{12}$ | 50 | PAN-PC/DEC(1:2) |
| Example 3 | $LiMn_{0.85}Fe_{0.1}Mg_{0.05}PO_4$ | $TiNb_2O_7$ | $Li_7La_3Zr_2O_{12}$ | 50 | PAN-PC/DEC(1:2) |
| Example 4 | $LiMn_2O_4$ | $Li_2Na_{1.5}Ti_{5.5}Nb_{0.5}O_{14}$ | $Li_7La_3Zr_2O_{12}$ | 50 | PAN-PC/DEC(1:2) |
| Example 5 | $LiMn_2O_4$ | $Li_4Ti_5O_{12}$ | $Li_7La_3Zr_2O_{12}$ | 50 | PAN-PC/DEC(1:2) |
| Example 6 | $LiMn_{0.85}Fe_{0.1}Mg_{0.05}PO_4$ | $Li_4Ti_5O_{12}$ | $Li_7La_3Zr_2O_{12}$ | 10 | PAN-PC/DEC(1:2) |
| Example 7 | $LiMn_{0.85}Fe_{0.1}Mg_{0.05}PO_4$ | $Li_4Ti_5O_{12}$ | $Li_7La_3Zr_2O_{12}$ | 100 | PAN-PC/DEC(1:2) |
| Example 8 | $LiMn_{0.85}Fe_{0.1}Mg_{0.05}PO_4$ | $Li_4Ti_5O_{12}$ | $Li_7La_3Zr_2O_{12}$ | 300 | PAN-PC/DEC(1:2) |
| Example 9 | $LiMn_{0.85}Fe_{0.1}Mg_{0.05}PO_4$ | $Li_4Ti_5O_{12}$ | $Li_7La_3Zr_2O_{12}$ | 500 | PAN-PC/DEC(1:2) |
| Example 10 | $LiMn_{0.85}Fe_{0.1}Mg_{0.05}PO_4$ | $Li_4Ti_5O_{12}$ | $Li_7La_3Zr_2O_{12}$ | 500 | PAN-PC/DEC(1:2) |
| Example 11 | $LiNi_{0.5}Co_{0.2}Mn_{0.3}O_2$ | $Li_4Ti_5O_{12}$ | $Li_7La_3Zr_2O_{12}$ | 50 | PAN-PC/MEC(1:2) |
| Example 12 | $LiNi_{0.5}Co_{0.2}Mn_{0.3}O_2$ | $Li_4Ti_5O_{12}$ | $Li_7La_3Zr_2O_{12}$ | 50 | PAN-EC/PC(1:2) |
| Example 13 | $LiFePO_4$ | $Li_2Na_{1.5}Ti_{5.5}Nb_{0.5}O_{14}$ | $Li_7La_3Zr_2O_{12}$ | 50 | PAN-PC/MBL(1:2) |
| Example 14 | $LiNi_{0.5}Co_{0.2}Mn_{0.3}O_2$ | $Li_4Ti_5O_{12}$ | $Li_7La_3Zr_2O_{12}$ | 50 | PAN-PC/DEC(1:2) |
| Example 15 | $LiNi_{0.5}Co_{0.2}Mn_{0.3}O_2$ | $Li_4Ti_5O_{12}$ | $LiAl_2O_3$ | 50 | PAN-PC/DEC(1:2) |
| Example 16 | $LiNi_{0.5}Co_{0.2}Mn_{0.3}O_2$ | $Li_4Ti_5O_{12}$ | $Li_2SiO_3$ | 50 | PAN-PC/DEC(1:2) |
| Example 17 | $LiMn_{0.85}Fe_{0.1}Mg_{0.05}PO_4$ | Graphite | $Li_7La_3Zr_2O_{12}$ | 50 | PAN-EC/DEC(1:2) |
| Example 18 | $LiMn_{0.85}Fe_{0.1}Mg_{0.05}PO_4$ | $Li_4Ti_5O_{12}$ | $Li_{6.4}La_3Zr_{1.6}Ta_{0.5}O_{12}$ | 50 | PAN-PC/DEC(1:2) |
| Example 19 | $LiMn_{0.85}Fe_{0.1}Mg_{0.05}PO_4$ | $Li_4Ti_5O_{12}$ | $Li_7La_3Zr_2O_{12}$ | 50 | PEO-PC/DEC(1:2) |
| Example 20 | $LiMn_{0.85}Fe_{0.1}Mg_{0.05}PO_4$ | $Li_4Ti_5O_{12}$ | $Li_7La_3Zr_2O_{12}$ | 50 | PAN-PC/DEC(1:2) |

TABLE 2

| | Positive electrode active material | Negative electrode active material | Lithium-containing oxide Composition | Content weight (%) | Specific surface area ($m^2/g$) | Polymer-organic solvent |
|---|---|---|---|---|---|---|
| Comparative Example 1 | $LiMn_{0.85}Fe_{0.1}Mg_{0.05}PO_4$ | $Li_4Ti_5O_{12}$ | $Al_2O_3$ | 95 | 50 | PAN-PC/DEC(1:2) |
| Comparative Example 2 | $LiMn_{0.85}Fe_{0.1}Mg_{0.05}PO_4$ | $Li_4Ti_5O_{12}$ | $Li_7La_3Zr_2O_{12}$ | 85 | 8 | PAN-PC/DEC(1:2) |
| Comparative Example 3 | $LiMn_{0.85}Fe_{0.1}Mg_{0.05}PO_4$ | $Li_4Ti_5O_{12}$ | $Li_7La_3Zr_2O_{12}$ | 95 | 5 | PAN-PC/DEC(1:2) |
| Comparative Example 4 | $LiMn_{0.85}Fe_{0.1}Mg_{0.05}PO_4$ | $Li_4Ti_5O_{12}$ | $Li_7La_3Zr_2O_{12}$ | 80 | 600 | PAN-PC/DEC(1:2) |
| Comparative Example 5 | $LiFePO_4$ | $Li_4Ti_5O_{12}$ | $Li_7La_3Zr_2O_{12}$ | 85 | 8 | PAN-MBL |
| Comparative Example 6 | $LiMn_{0.85}Fe_{0.1}Mg_{0.05}PO_4$ | $Li_4Ti_5O_{12}$ | Polyethylene separator (porosity: 45%) | — | — | PC/DEC(1:2) |
| Comparative Example 7 | $LiFePO_4$ | Li | $Li_{1.5}Al_{0.5}Ge_{1.5}(PO_4)_3$ | 50 | 50 | PEO- $LiClO_4$ |
| Comparative Example 8 | $LiCoO_2$ | Graphite | $Li_7La_3Zr_2O_{12}$ | 95 | 5 | PAN-EC/DEC(3:7) |

TABLE 3

| | Lithium-containing oxide weight (%) | Nonaqueous electrolyte weight (%) | Polymer weight (%) | Binder weight (%) |
|---|---|---|---|---|
| Example 1 | 95 | 2.5 | 0.7 | 1.8 |
| Example 2 | 95 | 2.5 | 0.7 | 1.8 |
| Example 3 | 95 | 2.5 | 0.7 | 1.8 |
| Example 4 | 95 | 2.5 | 0.7 | 1.8 |
| Example 5 | 95 | 2.5 | 0.7 | 1.8 |
| Example 6 | 96 | 2.0 | 0.54 | 1.46 |
| Example 7 | 95 | 2.5 | 0.7 | 1.8 |
| Example 8 | 94 | 3.2 | 0.9 | 1.9 |
| Example 9 | 92 | 5.0 | 1.4 | 1.6 |
| Example 10 | 92 | 5.0 | 1.4 | 1.6 |
| Example 11 | 90 | 7.0 | 2.0 | 1.0 |
| Example 12 | 95 | 2.5 | 0.7 | 1.8 |
| Example 13 | 95 | 2.5 | 0.7 | 1.8 |
| Example 14 | 95 | 2.5 | 0.7 | 1.8 |
| Example 15 | 95 | 2.5 | 0.7 | 1.8 |
| Example 16 | 95 | 2.5 | 0.7 | 1.8 |
| Example 17 | 95 | 2.5 | 0.7 | 1.8 |
| Example 18 | 95 | 2.5 | 0.7 | 1.8 |
| Example 19 | 95 | 2.5 | 0.7 | 1.8 |
| Example 20 | 98 | 0.8 | 0.2 | 1.0 |

TABLE 4

|  | Discharge capacity at 25° C. (Ah) | Average voltage (V) | Cycle life at 60° C. (times) | Discharge capacity retention ratio at 5 C. (%) | Discharge capacity retention ratio at −20° C. (%) |
|---|---|---|---|---|---|
| Example 1 | 4.0 | 2.55 | 6000 | 80 | 80 |
| Example 2 | 4.2 | 2.5 | 4500 | 75 | 70 |
| Example 3 | 4.3 | 2.5 | 5000 | 80 | 75 |
| Example 4 | 3.8 | 2.75 | 4000 | 90 | 90 |
| Example 5 | 3.9 | 2.45 | 4500 | 85 | 85 |
| Example 6 | 4.0 | 2.55 | 6000 | 70 | 70 |
| Example 7 | 4.0 | 2.55 | 6000 | 85 | 85 |
| Example 8 | 4.0 | 2.55 | 6000 | 87 | 88 |
| Example 9 | 4.0 | 2.55 | 4500 | 90 | 90 |
| Example 10 | 4.0 | 2.55 | 4000 | 90 | 90 |
| Example 11 | 4.25 | 2.17 | 5000 | 85 | 85 |
| Example 12 | 4.2 | 2.17 | 7000 | 80 | 70 |
| Example 13 | 3.9 | 2.05 | 6000 | 85 | 85 |
| Example 14 | 4.2 | 2.17 | 6000 | 80 | 80 |
| Example 15 | 4.2 | 2.17 | 6000 | 65 | 70 |
| Example 16 | 4.2 | 2.17 | 5000 | 65 | 70 |
| Example 17 | 4.3 | 3.8 | 3000 | 70 | 60 |
| Example 18 | 4.0 | 2.55 | 6000 | 85 | 82 |
| Example 19 | 3.8 | 2.5 | 7000 | 60 | 50 |
| Example 20 | 3.7 | 2.5 | 7000 | 60 | 55 |

TABLE 5

|  | Discharge capacity at 25° C. (Ah) | Average voltage (V) | Cycle life at 60° C. (times) | Discharge capacity retention rratio at 5 C. (%) | Discharge capacity retention ratio at −20° C. (%) |
|---|---|---|---|---|---|
| Comparative Example 1 | 4.0 | 2.55 | 1000 | 30 | 30 |
| Comparative Example 2 | 4.0 | 2.55 | 3000 | 40 | 40 |
| Comparative Example 3 | 4.0 | 2.55 | 3000 | 30 | 20 |
| Comparative Example 4 | 4.0 | 2.55 | 2000 | 50 | 30 |
| Comparative Example 5 | 3.9 | 1.85 | 200 | 35 | 40 |
| Comparative Example 6 | 3.8 | 2.55 | 2000 | 50 | 45 |
| Comparative Example 7 | 4.0 | 3.4 | 100 | 5 | 0 |
| Comparative Example 8 | 4.2 | 3.7 | 1000 | 50 | 50 |

In Tables 1 to 5, the secondary batteries of Examples 1 to 16 and 18 to 20 and Comparative Examples 1 to 6 using the titanium-containing oxide as the negative electrode active material are compared. The secondary batteries of Examples 1 to 16 and 18 to 20 have a more excellent discharge capacity retention ratio at 5 C as large current discharge performance, discharge capacity retention ratio at −20° C. as low temperature discharge performance, and high temperature cycle life performance at 60° C. than those of Comparative Examples 1 to 6.

Example 17 and Comparative Examples 7 and 8 using as the negative electrode active material a lithium metal and graphite which have a lithium inserting potential of less than 1V (vs. Li/Li$^+$) are compared. The secondary battery of Example 17 has a more excellent discharge capacity retention ratio at 5 C as large current discharge performance, discharge capacity retention ratio at −20° C. as low temperature discharge performance, and high temperature cycle life performance at 60° C. than those of Comparative Examples 7 and 8. Thus, it can be said that the secondary batteries of Examples have excellent high temperature cycle life performance at 60° C., and further have excellent thermal stability.

From the results of Examples 1 to 4, it was confirmed that the secondary battery having excellent large current discharge performance, low temperature discharge performance, and high temperature cycle life performance at 60° C. can be obtained also when the titanium-containing oxide other than the lithium titanium oxide having a spinel structure is used.

Example 21

A positive electrode slurry prepared in the same manner as in Example 1 was applied onto a first surface of a current collector containing an aluminum alloy foil having a thickness of 15 μm (purity: 99% by weight), followed by drying to form a positive electrode active material-containing layer. A negative electrode slurry prepared in the same manner as in Example 1 was applied onto a second surface of the current collector, followed by drying to form a negative electrode active material-containing layer. Thereby, an electrode body having a bipolar structure was obtained.

A composition prepared in the same manner as in Example 1 was applied onto the surfaces of the positive electrode active material-containing layer and negative electrode active material-containing layer of the electrode body having a bipolar structure, followed by drying to form a composite electrolyte layer having a thickness of 5 μm. Five electrode bodies each having a bipolar structure were produced in such procedures. The five electrode bodies each having a bipolar structure were connected in series so that the composite electrolyte layer was disposed between the positive electrode active material-containing layer and the negative electrode active material-containing layer, to produce a bipolar type secondary battery having a structure shown in FIG. 6 and having a capacity of 1 Ah.

Comparative Example 9

A bipolar type secondary battery having a structure shown in FIG. 6 and having a capacity of 1 Ah was produced in the same manner as in Example 21 except that the same composite electrolyte layer as that of Comparative Example 1 was used.

The bipolar type secondary battery was charged to 14.5 V at a constant current of 1 A at 25° C., then charged at a constant voltage of 14.5 V, and completed at a current of 0.05 A. Then, the discharge capacity of the bipolar type secondary battery in a discharge operation carried out at 1 A to 8 V was measured, to obtain a discharge capacity at 25° C. A capacity retention ratio in a discharge operation carried out at 5 C (20 A) (a capacity obtained in a discharge operation carried out at a current of 0.8 A was defined as 100) was measured as the large current discharge performance. Furthermore, a discharge capacity in a discharge operation carried out at 1 A at −20° C. was measured, and a capacity retention ratio with respect to the discharge capacity at 25° C. was measured to obtain a discharge capacity retention ratio at −20° C. In a high temperature cycle test at 60° C., the cycle of charging the bipolar type secondary battery to a voltage of 14.5 V at a constant current of 1 A in an environment of 60° C., and then discharging the bipolar type secondary battery to 8 V at 1 A was repeated, and the case where the capacity reached 80% of the initial capacity was defined as a cycle life. These results and the average voltages are shown in the following Table 6.

TABLE 6

|  | Discharge capacity at 25° C. (Ah) | Average voltage (V) | Cycle life at 60° C. (times) | Discharge capacity retention ratio at 5 C. (%) | Discharge capacity retention ratio at −20° C. (%) |
| --- | --- | --- | --- | --- | --- |
| Example 21 | 1 | 12.5 | 5000 | 85 | 85 |
| Comparative Example 9 | 1 | 12.5 | 300 | 30 | 30 |

As apparent from Table 6, it is found that Example 21 of the bipolar type secondary battery has more excellent large current discharge performance, low temperature discharge performance, and high temperature cycle life performance at 60° C. than those of Comparative Example 9, and particularly has excellent high temperature cycle life performance at 60° C.

A method for measuring the average particle sizes of the negative electrode active material particles and lithium-containing oxide particles will be described. A laser diffraction particle size analyzer (SALD-300 manufactured by Shimadzu Corporation) was used.

First, about 0.1 g of a sample, a surfactant, and 1 to 2 mL of distilled water were placed in a beaker, and then thoroughly stirred. The solution was then injected into a stirring water vessel. The light intensity distribution was measured 64 times at an interval of 2 seconds, and the particle size distribution data was analyzed to measure the average particle sizes.

A method for measuring the BET specific surface area based on $N_2$ adsorption of the lithium-containing oxide particles will be described. One g of the lithium-containing oxide particles was obtained, and used as the sample. A BET specific surface area measuring device manufactured by Yuasa Ionics Inc. was used, and nitrogen gas was used as an adsorption gas.

Examples 22 to 31

A nonaqueous electrolyte secondary battery was produced in the same manner as in Example 1 except that the positive electrode active material, the negative electrode active material, the composition and specific surface area of the lithium-containing oxide, the composition (% by weight) in the composite electrolyte, and the compositions of the polymer and organic solvent were changed as shown in the following Table 7.

The mixing ratio (% by weight) of the lithium-containing oxide particles, nonaqueous electrolytic solution, polymer, and binder in the composite electrolytes of Examples 22 to 31 are shown in Table 8.

The discharge capacity at 25° C., the average voltage, the cycle life at 60° C., the discharge capacity retention ratio at 5 C and the discharge capacity retention ratio at −20° C. of the secondary batteries of Examples 22 to 31 were measured in the same manner as in Example 1. These results are shown in the following Table 9.

TABLE 7

|  | Positive electrode active material | Negative electrode active material | Lithium-containing oxide Composition | Specific surface area ($m^2$/g) | Polymer-organic solvent |
| --- | --- | --- | --- | --- | --- |
| Example 22 | $LiMn_{0.85}Fe_{0.1}Mg_{0.05}PO_4$ | $Li_4Ti_5O_{12}$ | $Li_{1.4}Al_{0.4}Ge_{1.6}(PO_4)_3$ | 50 | PAN-PC/DEC(1:2) |
| Example 23 | $LiMn_{0.85}Fe_{0.1}Mg_{0.05}PO_4$ | $TiO_2(B)$ | $Li_{1.4}Al_{0.4}Ge_{1.6}(PO_4)_3$ | 50 | PAN-PC/DEC(1:2) |
| Example 24 | $LiMn_{0.85}Fe_{0.1}Mg_{0.05}PO_4$ | $TiNb_2O_7$ | $Li_{1.4}Al_{0.4}Ge_{1.6}(PO_4)_3$ | 50 | PAN-PC/DEC(1:2) |
| Example 25 | $LiMn_2O_4$ | $Li_2Na_{1.5}Ti_{5.5}Nb_{0.5}O_{14}$ | $Li_{1.4}Al_{0.4}Ge_{1.6}(PO_4)_3$ | 50 | PAN-PC/DEC(1:2) |
| Example 26 | $LiFePO_4$ | $Li_2Na_{1.5}Ti_{5.5}Nb_{0.5}O_{14}$ | $Li_{1.4}Al_{0.4}Ge_{1.6}(PO_4)_3$ | 50 | PAN-PC/DEC(1:2) |
| Example 27 | $LiNi_{0.5}Co_{0.2}Mn_{0.3}O_2$ | $Li_4Ti_5O_{12}$ | $Li_{1.4}Al_{0.4}Ge_{1.6}(PO_4)_3$ | 50 | PAN-PC/DEC(1:2) |
| Example 28 | $LiNi_{0.8}Co_{0.1}Mn_{0.1}O_2$ | $TiNb_2O_7$ | $Li_{1.3}Al_{0.3}Zr_{1.7}(PO_4)_3$ | 50 | PAN-PC |
| Example 29 | $LiNi_{0.8}Co_{0.1}Mn_{0.1}O_2$ | $TiNb_2O_7$ | $Li_{1.3}Al_{0.3}Ti_{1.7}(PO_4)_3$ | 50 | PAN-PC |
| Example 30 | $LiNi_{0.8}Co_{0.1}Mn_{0.1}O_2$ | $TiNb_2O_7$ | $Li_{1.3}Al_{0.3}Sr_{1.7}(PO_4)_3$ | 50 | PAN-PC |
| Example 31 | $LiNi_{0.8}Co_{0.1}Mn_{0.1}O_2$ | $TiNb_2O_7$ | $Li_{1.3}Al_{0.3}Sn_{1.7}(PO_4)_3$ | 50 | PAN-PC |

TABLE 8

| | Lithium-containing oxide weight (%) | Nonaqueous electrolyte weight (%) | Polymer weight (%) | Binder weight (%) |
|---|---|---|---|---|
| Example 22 | 92 | 5.0 | 1.4 | 1.6 |
| Example 23 | 92 | 5.0 | 1.4 | 1.6 |
| Example 24 | 92 | 5.0 | 1.4 | 1.6 |
| Example 25 | 92 | 5.0 | 1.4 | 1.6 |
| Example 26 | 92 | 5.0 | 1.4 | 1.6 |
| Example 27 | 92 | 5.0 | 1.4 | 1.6 |
| Example 28 | 92 | 5.0 | 1.4 | 1.6 |
| Example 29 | 92 | 5.0 | 1.4 | 1.6 |
| Example 30 | 92 | 5.0 | 1.4 | 1.6 |
| Example 31 | 92 | 5.0 | 1.4 | 1.6 |

TABLE 9

| | Discharge capacity at 25° C. (Ah) | Average voltage (V) | Cycle life at 60° C. (times) | Discharge capacity retention ratio at 5 C. (%) | Discharge capacity retention ratio at −20° C. (%) |
|---|---|---|---|---|---|
| Example 22 | 4.0 | 2.55 | 6500 | 78 | 75 |
| Example 23 | 4.2 | 2.55 | 4600 | 72 | 70 |
| Example 24 | 4.3 | 2.5 | 5200 | 78 | 72 |
| Example 25 | 3.8 | 2.75 | 4700 | 86 | 82 |
| Example 26 | 3.9 | 2.05 | 6200 | 70 | 70 |
| Example 27 | 4.4 | 2.3 | 4000 | 85 | 80 |
| Example 28 | 4.6 | 2.25 | 3800 | 86 | 82 |
| Example 29 | 4.6 | 2.35 | 3700 | 88 | 83 |
| Example 30 | 4.5 | 2.25 | 3500 | 82 | 80 |
| Example 31 | 4.3 | 2.25 | 3400 | 80 | 78 |

As shown in Tables 7 to 9, the secondary batteries of Examples 22 to 31, each including the lithium phosphate solid electrolyte having NASICON type structure as the lithium-containing oxide particles, have a more excellent discharge capacity retention ratio at 5 C as large current discharge performance, discharge capacity retention ratio at −20° C. as low temperature discharge performance, and high temperature cycle life performance at 60° C. than those of Comparative Examples 1 to 6.

Example 32

A positive electrode slurry having the same composition as in Example 22 was applied onto a first surface of a current collector containing an aluminum alloy foil having a thickness of 15 μm (purity: 99% by weight), followed by drying to form a positive electrode active material-containing layer. A negative electrode slurry having the same composition as in Example 22 was applied onto a second surface of the current collector, followed by drying to form a negative electrode active material-containing layer. Thereby, an electrode body having a bipolar structure was obtained.

A composition having the same composition as in Example 22 was applied onto the surfaces of the positive electrode active material-containing layer and negative electrode active material-containing layer of the electrode body having a bipolar structure, followed by drying to form a composite electrolyte layer having a thickness of 5 μm. Five electrode bodies each having a bipolar structure were produced in such procedures. The five electrode bodies each having a bipolar structure were connected in series so that the composite electrolyte layer was disposed between the positive electrode active material-containing layer and the negative electrode active material-containing layer, to produce a bipolar type secondary battery having a structure shown in FIG. 6 and having a capacity of 1 Ah.

The discharge capacity at 25° C., the average voltage, the cycle life at 60° C., the discharge capacity retention ratio at 5 C and the discharge capacity retention ratio at −20° C. of the bipolar type secondary battery were measured in the same manner as in Example 21. These results are shown in the following Table 10.

TABLE 10

| | Discharge capacity at 25° C. (Ah) | Average voltage (V) | Cycle life at 60° C. (times) | Discharge capacity retention ratio at 5 C. (%) | Discharge capacity retention ratio at −20° C. (%) |
|---|---|---|---|---|---|
| Example 32 | 1 | 12.5 | 5500 | 80 | 81 |

As shown in Table 10, the bipolar type secondary battery of Example 32, which includes the lithium phosphate solid electrolyte having NASICON type structure as the lithium-containing oxide particles, has a more excellent discharge capacity retention ratio at 5 C as large current discharge performance, discharge capacity retention ratio at −20° C. as low temperature discharge performance, and high temperature cycle life performance at 60° C.

According to the composite electrolyte of at least one embodiment or Example thereof, the composite electrolyte containing the lithium-containing oxide particles and the electrolytic composition is provided. The specific surface area of the lithium-containing oxide particles measured by the BET adsorption method using $N_2$ is 10 m$^2$/g to 500 m$^2$/g. The content of the lithium-containing oxide particles in the composite electrolyte is 90% by weight to 98% by weight. Furthermore, the electrolytic composition contains the lithium ions, the organic solvent, and the polymer. According to the composite electrolyte of the embodiment, the lithium ion conductivity of the electrolyte can be improved.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
a positive electrode active material-containing layer;
a negative electrode active material-containing layer comprising a negative electrode active material comprising at least one selected from the group consisting of a carbon material, a graphite material, a lithium alloy, a metal oxide, and a metal sulfide; and
a composite electrolyte provided between the positive electrode active material-containing layer and the negative electrode active material-containing layer, wherein:
the composite electrolyte comprises
lithium-containing oxide particles having a specific surface area, which is measured by a BET adsorption method using $N_2$, of 10 m$^2$/g to 500 m$^2$/g, and an average size of the lithium-containing oxide particles being 0.01 μm to 0.5 μm; and
an electrolytic composition which comprises lithium ions, an organic solvent and a polymer;
wherein the organic solvent comprises phosphoric ester.

2. The secondary battery according to claim 1, wherein the organic solvent comprises carbonates.

3. The secondary battery according to claim 2, wherein the carbonates is at least one selected from a group consisting of propylene carbonate, ethylene carbonate, diethyl carbonate, and methylethyl carbonate.

4. The secondary battery according to claim 1, wherein the lithium-containing oxide particles include at least one selected from the group consisting of particles of a lithium ion conductive oxide solid electrolyte having a garnett type structure, and particles of a lithium phosphate solid electrolyte having NASICON type structure.

5. The secondary battery according to claim 1, wherein the negative electrode active material comprises the metal oxide and the metal oxide is a titanium-containing oxide.

6. The secondary battery according to claim 5, wherein the titanium-containing oxide comprises at least one selected from a group consisting of a lithium titanium oxide having a spinel structure, a monoclinic titanium oxide, and a niobium titanium oxide.

7. The secondary battery according to claim 1, further comprising a current collector having a first surface and a second surface positioned opposite to the first surface,
wherein the current collector has a bipolar structure in which the positive electrode active material-containing layer is formed on the first surface of the current collector and the negative electrode active material-containing layer is formed on the second surface.

8. The secondary battery according to claim 1, wherein the positive electrode active material-containing layer contains a positive electrode active material containing at least one selected from the group consisting of a phosphate compound having an olivine structure, and $Li_xNi_{1-y-z}Co_yMn_zO_2$ where $0<x≤1$, $0<y≤1$, $0≤z≤1$.

9. The secondary battery according to claim 8, wherein the phosphate compound having the olivine structure is represented by $Li_xFe_{1-y-z}Mn_yM_zPO_4$,
wherein:
M is at least one element selected from the group consisting of Mg, Al, Ti, and Zr; and
$0≤x≤1.1$, $0≤y≤1$, and $0≤z≤0.2$ are set.

10. A battery pack comprising the secondary battery according to claim 1.

11. The battery pack according to claim 10 further comprising:
an external power distribution terminal; and
a protective circuit.

12. The battery pack comprising secondary batteries, each according to claim 1; and
the secondary batteries are electrically connected in series, in parallel, or in combination of series and parallel.

13. A vehicle comprising the battery pack according to claim 10.

14. The vehicle according to claim 13, wherein the battery pack is configured to recover a regenerative energy of a power of the vehicle.

15. The secondary battery according to claim 1, wherein the phosphoric ester is at least one selected from a group consisting of trimethyl phosphate, triethyl phosphate, tripropyl phosphate, and tributyl phosphate.

16. The secondary battery according to claim 1, wherein the composite electrolyte is directly formed on one surface or both surfaces of at least one of the positive electrode active material-containing layer and the negative electrode active material-containing layer.

17. The secondary battery according to claim 1, wherein a content of the polymer in the composite electrolyte is 0.2% by weight to 3% by weight.

18. The secondary battery according to claim 1, wherein the composite electrolyte further comprises a binder,
the polymer comprises at least one selected from the group consisting of polyacrylonitrile, polyethylene oxide, polyvinylidene fluoride, and polymethyl methacrylate,
the binder comprises at least one selected from the group consisting of polyvinylidene fluoride and acrylic binder, and
the polymer is different from the binder.

19. The secondary battery according to claim 18, wherein a content of the binder in the composite electrolyte is 3% by weight or less.

* * * * *